United States Patent
Otsuka et al.

(10) Patent No.: US 6,927,868 B1
(45) Date of Patent: Aug. 9, 2005

(54) FACSIMILE DEVICE AND MEMORY MEDIUM STORING COMPUTER PROGRAMS FOR CONTROLLING THE FACSIMILE DEVICE

(75) Inventors: Shuji Otsuka, Nagoya (JP); Kazunobu Asai, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/237,896

(22) Filed: Jan. 27, 1999

(30) Foreign Application Priority Data

| Jan. 30, 1998 | (JP) | 10-018788 |
| Jan. 30, 1998 | (JP) | 10-018806 |
| Jan. 30, 1998 | (JP) | 10-018824 |
| Mar. 26, 1998 | (JP) | 10-100063 |
| Mar. 26, 1998 | (JP) | 10-100064 |

(51) Int. Cl.$^7$ .................................................. H04N 1/00
(52) U.S. Cl. ................ 358/1.15; 358/402; 358/403; 358/434; 379/100.01; 379/100.08
(58) Field of Search ................. 358/403, 1.16, 358/1.15, 1.1, 442, 444, 402, 404, 400, 468, 434, 440; 379/100.08, 100.01

(56) References Cited

U.S. PATENT DOCUMENTS 5,224,156 A * 6/1993 Fuller et al. ............ 379/100.08
5,283,665 A * 2/1994 Ogata .......................... 358/434
5,727,050 A * 3/1998 Mori et al. ............. 379/100.09
6,104,504 A * 8/2000 Imai et al. ................... 358/407

FOREIGN PATENT DOCUMENTS

| JP | 01-233966 | 9/1989 |
| JP | 08-130622 | 5/1996 |
| JP | A-8-168009 | 6/1996 |
| JP | 10-023192 | 1/1998 |

* cited by examiner

Primary Examiner—Joseph R. Pokrzywa
(74) Attorney, Agent, or Firm—Oliff & Berridge, PLC

(57) ABSTRACT

CPU 1 of a facsimile device, when detects a transfer command from a calling side, stores "box No.", "identification No." and "Telephone number of transfer destination" of the transfer command in RAM 3, judges the effectiveness of "box No.", that is, adequacy of the specification method. When the specification method of the box No. of the transfer command is wrong (S2: No), or when there is no memory box accompanied with the box No. (S10: No), or when no image data is registered in the relevant memory box (S9: No), or when "identification No." of the transfer command is wrong (S11: No), the operation manual and the image data for registered information guide of the bulletin board box are transmitted to the calling side (S3, S6).

30 Claims, 20 Drawing Sheets

FIG. 5

Fetching information from the confidential box :
1. Press the [function] key.
2. Press [1] and [0] keys.
3. Enter box number.
   - Box No. is a three-digit numeral from 101-105.
4. Press the [set] key.
5. Enter the identification No.
   - Identification No. is of 4 digits.
   - Usable characters are #, *, and numerals of 0-9.
6. Press the [set] key.
7. Specify the destination and press the [set] key.
   Press the [clear] key and re-enter when mistake is made.
8. Press the [start] key.
   "Received" is to be displayed.

Fetching information from the bulletin board box:
1. Press the [function] key.
2. Press [1] and [1] keys.
3. Enter box number.
   - Box No. is a two-digit numeral from 01-99.
4. Press the [set] key.
5. Specify the destination and press the [set] key.
   Press the [clear] key and re-enter when mistake is made.
6. Press the [start] key.
   "Received" is to be displayed.

FIG. 6

REGISTERED CONTENTS OF CONFIDENTIAL BOX AND BULLETIN BOARD BOX

1. CONFIDENTIAL BOX

| BOX NO. | 101 | 102 | 103 | 104 | 105 |
|---|---|---|---|---|---|
| USER | YAMADA | SUZUKI | TANAKA | SATO | YAMAMOTO |

2. BULLETIN BOARD BOX

| BOX NO. | CONTENTS |
|---|---|
| 01 | GUIDE TO REGISTERED INFORMATION |
| 02 | INFORMATION ON NEW PRODUCTS |
| 03 | INFORMATION ON VERSION UP |
| 11 | INFORMATION ON F-CODE |
| 12 | INFORMATION ON CONFIDENTIAL FUNCTION |
| 13 | INFORMATION ON BULLETIN BOARD FUNCTION |

* THOSE WITH DATA REGISTERED ONLY ARE RECITED.

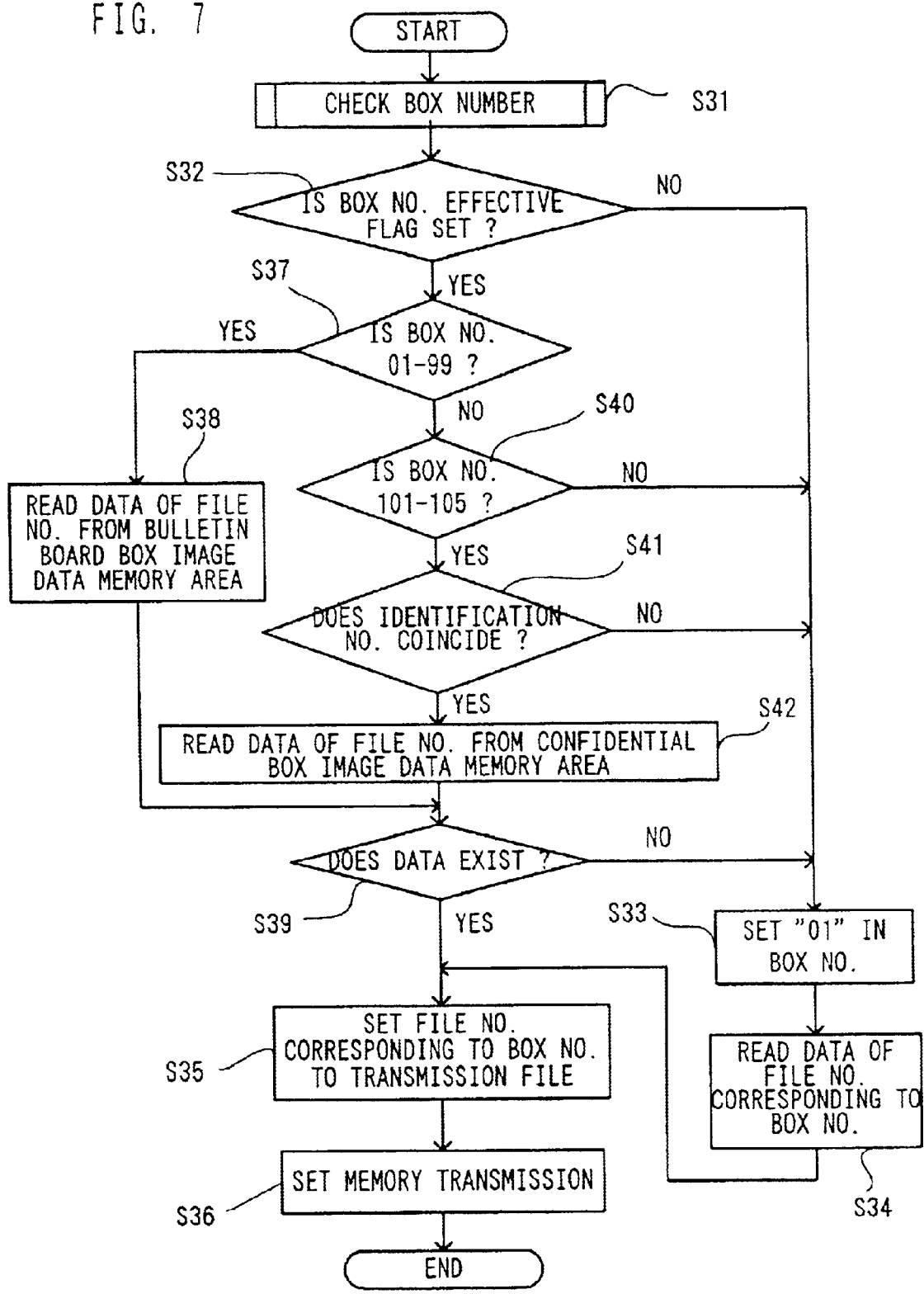

METHOD OF FETCHING INFORMATION FROM CONFIDENTIAL BOX AND BULLETIN BOARD BOX

1. Fetching information from the confidential box:
   Call after specify the box No. (101-105) and
   the identification No. (××××).
2. Fetching information from the bulletin board box:
   Call after specify the box No. (01-99).
※ Usable characters for box No. are numerals of 0-9.
※ Usable characters for identification No. are #, *, and numerals of 0-9.

Registered contents of confidential box and bulletin board box

1. CONFIDENTIAL BOX

| BOX NO. | 101 | 102 | 103 | 104 | 105 |
|---|---|---|---|---|---|
| USER | YAMADA | SUZUKI | TANAKA | SATO | YAMAMOTO |

2. BULLETIN BOARD BOX

| BOX NO. | CONTENTS |
|---|---|
| 01 | GUIDE TO REGISTERED INFORMATION |
| 02 | INFORMATION ON NEW PRODUCTS |
| 03 | INFORMATION ON VERSION UP |
| 11 | INFORMATION ON F-CODE |
| 12 | INFORMATION ON CONFIDENTIAL FUNCITON |
| 13 | INFORMATION ON BULLETIN BOARD FUNCTION |

* THOSE WITH DATA RESIGTERED ONLY ARE RECITED.

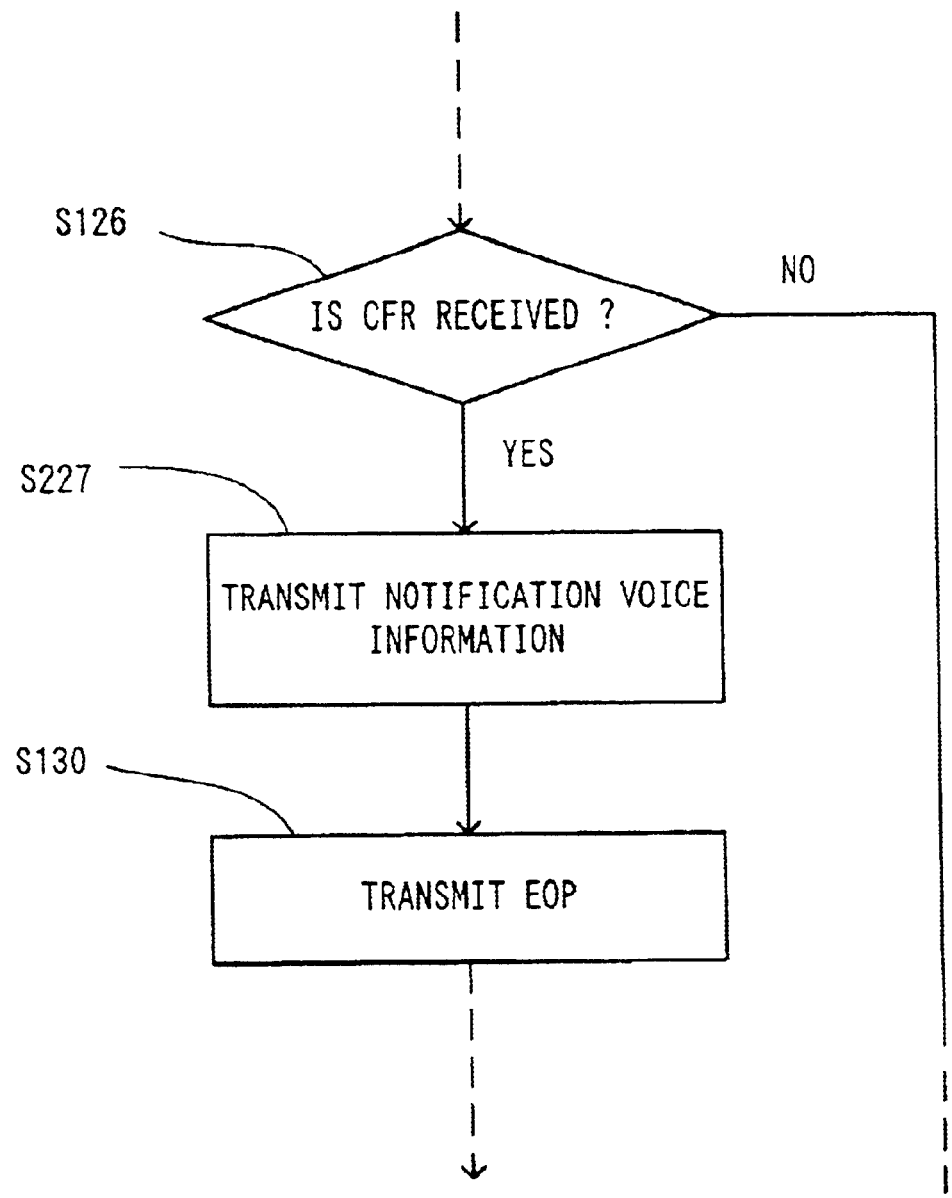

FACSIMILE DEVICE AND MEMORY MEDIUM STORING COMPUTER PROGRAMS FOR CONTROLLING THE FACSIMILE DEVICE

BACKGROUND OF THE INVENTION

1. Field of the Invention

The present invention relates to a facsimile device equipped with a remote information fetch capability, and particularly to a facsimile device which enables a calling side to easily learn that an error is caused by an erroneous operating method or absence of data by transferring a proper operating method to be carried out on an information requesting side and/or image data such as a list of contents of data registered, etc. when there is no box with a box number and an identification number that corresponds to the box number and identification number specified by the calling side at the time of remote information fetching, or even though the box corresponding to the specified number exists but no image data is stored therein.

The present invention also relates to a communication device which provides information via facsimile communication, and a memory medium in which computer programs for controlling the communication device are stored.

2. Description of Related Art

Hitherto, for a facsimile device, various proposals have been made on the remote information fetching capacity for transferring image data stored in boxes provided in an image data memory to a calling side, namely, an opposite facsimile device.

For example, the facsimile device recited in Japanese Non-examined Patent Publication No. 8(1996)-168009 has a remote procedure shifting means for shifting to the DTMF remote control procedure when a DTMF remote start command is received while reply is being received during the initial identification procedure, a DTMF analysis means for analyzing DTMF signals in the DTMF remote control procedure, an accumulation means for accumulating images in a specified memory box, an image transferring means for transferring images in the memory box, and a memory box establishing means for establishing a memory box for accumulating or storing the received images. When a remotely instructed command is an instruction to transfer images in the memory box in the DTMF remote control procedure, the facsimile device identifies a memory box which possesses the sub-address and/or password that coincide with the sub-address and/or password conforming to ITU-T (International Telecommunication Union-Telecommunication Sector) stored in the DTMF signal, and transfers the image of the relevant memory box after completion of the DTMF remote control procedure.

By this configuration, when a command instructed by the DTMF command is to transfer the image in the memory box, the image of the memory box is able to be transferred after identifying the memory box that possesses the sub-address and the password that coincide with the sub-address and the password stored in the DTMF signals in the DTMF remote control procedure.

However, in the facsimile device recited in Japanese Non-examined Patent Publication No. 8(1996)-168009, when the number of digits or usable characters of the sub-address and the password conforming to ITU-T stored in the DTMF signal vary according to facsimile device of the receiving side or when no image is stored in the memory box that possesses the sub-address and the password that coincide with this sub-address and password, an error occurs and the circuit is open, causing a problem in that the information fetching side, that is, the calling side, is unable to learn whether the error is caused by a circuit failure or not.

Meanwhile, for the facsimile device serving as a communication device for furnishing various kinds of information via facsimile communication, an information providing means using so-called F-code is proposed.

This F-code is one of the application functions of facsimile communication using sub-address/selective polling command in the communication protocol specified in ITU-T. And in order to carry out facsimile communication using the F-code, a communication system called F-code bulletin board communication is specified by the Communication Manufacturers' Association in Japan.

This F-code bulletin board communication is a communication system in which the information furnishing side possesses a memory with a plurality of boxes (memory area) storing information and the information requiring side specifies the box number in the memory on the information furnishing side on the communication protocol, thereby fetching and receiving the information stored in the specified box.

However, in the means for providing information by the use of the F-code bulletin board communication, the side who requires the supply of the information must know the box number of the box storing the information he wants beforehand. Therefore, the information furnishing side has a problem for notifying the box number to the information requiring side by using mass-media, etc.

In addition, for a means to provide the information using the F-code bulletin board communication, the facsimile device of the side requiring the supply of information must be equipped with functions to carry out F-code bulletin board communication. Consequently, when the transfer of information is requested by general polling using a facsimile device which is not equipped with a function to carry out F-code bulletin board communication, messages are received but the next communication procedure does not take place, and there is a problem in that undefined communication error occurs in the facsimile device of the information transfer requesting side.

SUMMARY OF THE INVENTION

The present invention has been made in view of the above circumstances and has an object to overcome the above problems and to provide a facsimile device enabling a calling side to easily learn that an error is caused by an erroneous operating method or absence of registered data by transferring the operating method of information furnishing side and/or image data such as a list of contents of data registered, etc. to the calling side when there is no box with a box number and an identification number that correspond to the box number and identification number specified by the calling side at the time of remote information fetching, or even though the box corresponding to the specified number exists but no image data is stored therein.

The second object of the present invention is to provide a facsimile device and a memory medium whereby the information furnishing side is not needed to notify the box number to the information requiring side by using mass-media. etc.

The third object of the present invention is to provide a facsimile device capable of preventing the occurrence of undefined communication error in a facsimile device of an information requiring side even when the transfer of information is requested by the information requiring side using the facsimile device having no function for conducting the transfer request by specifying the image information to be received in accordance with a predetermined facsimile communication procedure.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a facsimile device including an image data memory for storing image data, a plurality of memory boxes provided in the image data memory, each of the memory boxes being accompanied with a predetermined box number and storing first image data therein, a detection device for detecting a transfer command arrived to the facsimile device, the transfer command specifying a memory box in accordance with the box number and instructing transfer of the first image data stored in the specified memory box to a calling side, a judgment device for judging whether or not the memory box specified by the transfer command using the box number detected by the detection device is effective, an image transfer device for transferring the first image data stored in the specified memory box to the calling side when the judgment device judges that the memory box specified by the transfer command is effective, and alternatively for transferring second image data different from the first image data to the calling side when the judgment device judges that the memory box specified by the transfer command is ineffective.

In the above facsimile device, when the transfer command detection device detects the transfer command and the judgment device judges that the method of specifying the box number by the transfer command is ineffective, the second image data is transferred to the calling side.

Thus, the second data is transferred to the calling side when an error occurs in the device of the calling side due to a mistake in the specifying method of the box number by the transfer command. The calling side is able to learn that the error is not caused by circuit failure and to modify the transfer command in accordance with the second image data to surely obtain the first image data stored in the desired memory box of the relevant facsimile device.

According to the second aspect of the present invention, there is provided the facsimile device wherein the second image data is stored in a memory box specified in advance from among the memory boxes, the image transfer device transfers the second image data stored in the specified memory box to the calling side when the judgment device judges that the designation of memory box specified by the transfer command is ineffective.

In the facsimile device constructed as above, when the transfer command detection device detects the transfer command and the judgment device judges that the method of specifying the box number by the transfer command is ineffective, the second image data of the previously specified memory box in which the image data representing, for example, a method of specifying box number, etc.

Accordingly, when the box number is specified by mistakes, the calling side is able to obtain correct information of the specifying method of the transfer command. It is possible for the calling side to modify the incorrect part of the box number and others to surely obtain the image data stored in the desired memory box from the relevant-facsimile device.

According to the third aspect of the present invention, there is provided the facsimile device including a message data memory for storing in advance a plurality of message data, a transfer data setting device for choosing a first message data from the message data memory, the first message data indicating that designation of the memory box number is ineffective, when the judgment device judges that the designation of the memory box specified by the transfer command is ineffective, and for setting transfer data in accordance with the chosen first message data.

In the facsimile constructed as above, when the transfer command detection device detects the transfer command and the judgment device judges that the method of specifying the box number by the transfer command is ineffective, the transfer data is set based on the first message data to the effect that the box number specified by the transfer command is ineffective and the image transfer device transfers the transfer data to the calling side. Accordingly, the first image data is transferred to calling side when an error occurs therein due to a mistake in the method of specifying the box number, so that the calling side is able to learn the cause of the error.

According to the fourth aspect of the present invention, there is provided a facsimile device including a first memory for storing image information and specific information for specifying the image information, a second memory for storing contents information for indicating memory contents stored in the first memory, a judgment device for judging whether or not a transmission requesting signal indicating a request of transmitting the image information is a signal indicating that the transmission request is to be executed in accordance with a predetermined facsimile communication procedure when the transmission requesting signal is transmitted from a calling side, a first transmission device for reading the image information corresponding to the transmission requesting signal from the first memory and transmitting the read image information to the calling side when the judgment device judges that the transmission requesting signal is the signal indicating that the transmission request is to be executed in accordance with the predetermined facsimile transmission procedure, and a second transmission device for reading the contents information from the second memory and transmitting the read contents information to the calling side when the judgment device judges that the transmission requesting signal is not the signal indicating that the transmission request is to be executed in accordance with the predetermined facsimile transmission procedure.

In the facsimile device, the judgment device judges whether or not the transmission requesting signal transmitted from the device of the calling side represents that the transmission request is to be executed in accordance with a predetermined facsimile communication procedure. When the judgment device judges that the transmission requesting signal represents that the transmission request is to be executed in accordance with the predetermined facsimile transmission procedure, the first transmission device reads out the image information corresponding to the transmission requesting signal from the first memory and transmits the read image information to the calling side. When the judgment device judges that the transmission requesting signal does not represent that the transmission request is to be executed in accordance with the predetermined facsimile transmission procedure, the second transmission device reads out the contents information from the second memory storing the contents information indicating the memory contents in the first memory and transmits the read contents information to the calling side.

Specifically, the facsimile device (the information furnishing side) of the invention can read out the contents information indicating the memory contents in the first memory and transmit it to the device of the information requesting side when this information requesting side device doe not specify information.

The facsimile device (the information furnishing device) can provide the memory contents stored in the first memory to the information transfer requesting side device even when this information transfer requesting side device does not know the memory contents in the first memory. It is thus possible to achieve the facsimile device whereby the information furnishing side does not have to notify box numbers to the information requesting side by using mass-media.

According to the fifth aspect of the present invention, there is provided a facsimile device including a first memory for storing image information and specific information for specifying the image information, a second memory for storing contents information for indicating memory contents stored in the first memory, a judgment device for judging whether or not a transmission requesting signal indicating a request of transmitting the image information is a signal indicating that the transmission request is to be executed in accordance with a predetermined facsimile communication procedure when the transmission requesting signal is transmitted from a calling side, a first transmission device for reading the image information corresponding to the transmission requesting signal from the first memory and transmitting the read image information to the calling side when the judgment device judges that the transmission requesting signal is the signal indicating that the transmission request is to be executed in accordance with the predetermined facsimile transmission procedure, and a second transmission device for transmitting the information corresponding to judgment results by the judgment device to the calling side when the judgment device judges that the transmission requesting signal is not the signal indicating that the transmission request is to be executed in accordance with the predetermined facsimile transmission procedure.

In the facsimile device, the judgment device judges whether or not the transmission requesting signal transmitted from the device of the calling side represents that the transfer request is to be executed in accordance with a predetermined facsimile communication procedure. When the judgment device judges that the transfer requesting signal represents that the transmission request is to be executed in accordance with the predetermined facsimile transmission procedure, the first transmission device reads out the image information corresponding to the transfer requesting signal from the first memory and transmits the read image information to the calling side. When the judgment device judges that the transfer requesting signal does not represent that the transfer request is to be executed in accordance with the predetermined facsimile transmission procedure, the second transmission device transmits the information corresponding to the judgment result to the information transfer requesting side device.

Specifically, when the device of the information transfer requesting side make a transfer request of the image information though the device is not equipped with the function of executing the transfer request specifying the image information to be received in accordance with the predetermined facsimile communication procedures, the facsimile device of the present invention can transmit the information to the effect that the device of the information transfer requesting side is not able to be supplied with the information because the device is not equipped with the above function.

In this way, different from the conventional device, the device of the information transfer requesting side, without the occurrence of an communication error of unknown origin, is able to learn that it can not obtain the desired information.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 5 is an example of an image data to show an operating manual for fetching registered information from a confidential box and a bulletin board box in the first embodiment;

FIG. 6 is an example of an image data stored in a bulletin board memory box of box number "01" in the first embodiment;

FIG. 7 is a main flowchart for an image transfer control processing in a facsimile device in a second embodiment according to the present invention;

FIG. 9 is an example of an image data stored in the bulletin board box of box number "01" in the second embodiment;

FIG. 20 is a flowchart showing the communication control to be executed by CPU 140 in the seventh embodiment, in which a part of the control is omitted.

DETAILED DESCRIPTION OF THE PREFERRED EMBODIMENTS

A detailed description of preferred embodiments of a facsimile device embodying the present invention will now be given referring to the accompanying drawings.

Figure 1:
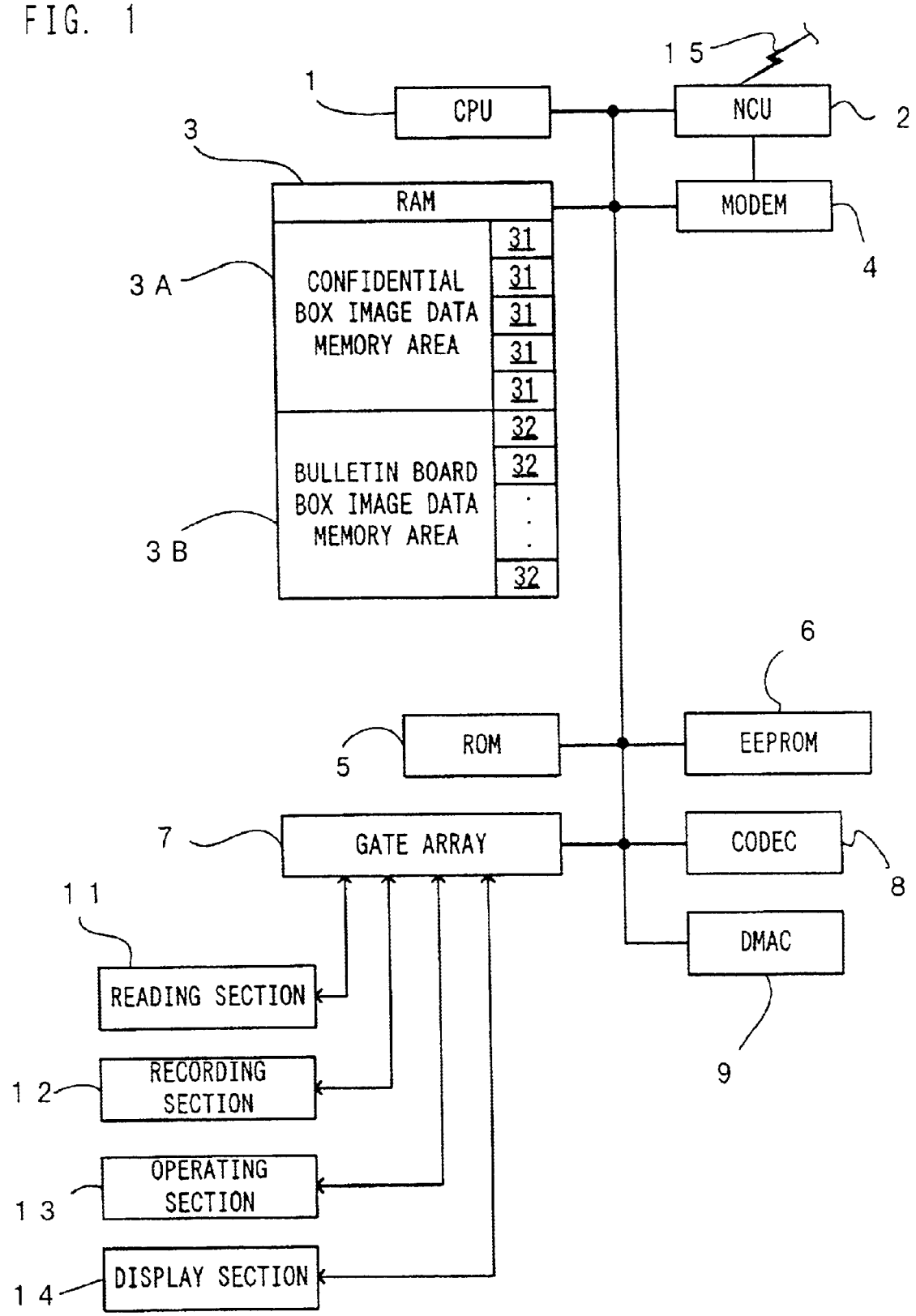
FIG. 1 is a circuit block diagram of a main part of a facsimile device in a first embodiment according to the present invention.

Description of a schematic structure of the facsimile device in a first embodiment is first made with reference to FIG. 1. FIG. 1 is a circuit block diagram of the facsimile device in the embodiment.

In FIG. 1, a schematic structure of the circuit of the facsimile device comprises a CPU 1, an NCU 2, a RAM 3, a modem 4, a ROM 5, an EEPROM 6, a gate array 7, a codec 8, a DMAC 9, a reading section 11, a recording section 12, an operating section 13, and a display section 14. Those CPU 1, NCU 2, RAM 3, modem 4, ROM 5, EEPROM 6, gate array 7, codec 8, and DMAC 9 are connected to one another via bus lines. The reading section 11, recording section 12, operating section 13, and display section 14 are connected to the gate array 7. The modem 4 and the telephone circuit 15 are connected to the NCU 2.

The CPU 1 controls the whole facsimile device. The NCU 2 is connected to the telephone circuit 15 to perform network control. The RAM 3 temporarily stores various digital data such as image information, voice data, and so on. This RAM 3 includes a confidential image data memory area 3A having a plurality of memory boxes 31 for individually storing confidential image data which are received via the telephone circuit 15 or read by the reading section 11, and a bulletin board image data memory area 3B having a plurality of memory boxes 32 for individually storing image data of bulletin board which are received via the telephone circuit 15 or read by the reading section 11.

The modem 4 performs modulation of transfer data and demodulation of received data. The ROM 5 stores various programs and data needed for executing facsimile functions. The EEPROM 6 stores a plurality of image data representing an operating method and the like, various registered data, and flags. The gate array 7 functions as an input and output interface for the CPU 1. The codec 8 decodes the received image data which has been demodulated by the modem 4. The codec 8 also encodes the transfer image data and transmits it to the modem 4 to demodulate. The DMAC 9 controls the memory access to the RAM 3 and others. The reading section 11 is provided with a light source, a CCD sensor, and a motor for feeding original, to read the image on the original and output image signals. The recording section 12 is a thermal transfer printer or a laser printer, which serves as a printing device for recording images of the image data on a recording sheet. The operating section 13 has a group of key switches which output operational signals in response to the operation by a user. Furthermore, the display section 14 comprises a compact LCD and the like, which serves as a display device for displaying various display under the control of CPU 1.

CPU 1 serves as a transfer command detection device for detecting transfer command signal input via the telephone circuit 15 from a calling side in facsimile communication. The RAM 3 serves as an image data memory, in which each of the confidential boxes 31 of the confidential image data memory area 3A is accompanied with a box number (referred to as box No. hereinafter) and an identification number (identification No.) which will be mentioned later, and each of the bulletin board boxes 32 of the bulletin image data memory area 3B is accompanied with a box number which will be mentioned later.

The CPU 1 constructs a storage device for storing the image data received via the telephone circuit 15 and the image data read by the recording section 11 in a specified one of the memory boxes 31 and 32. The CPU 1, codec 9, modem 8, and NCU 2 construct an image transfer device.

Figure 2:
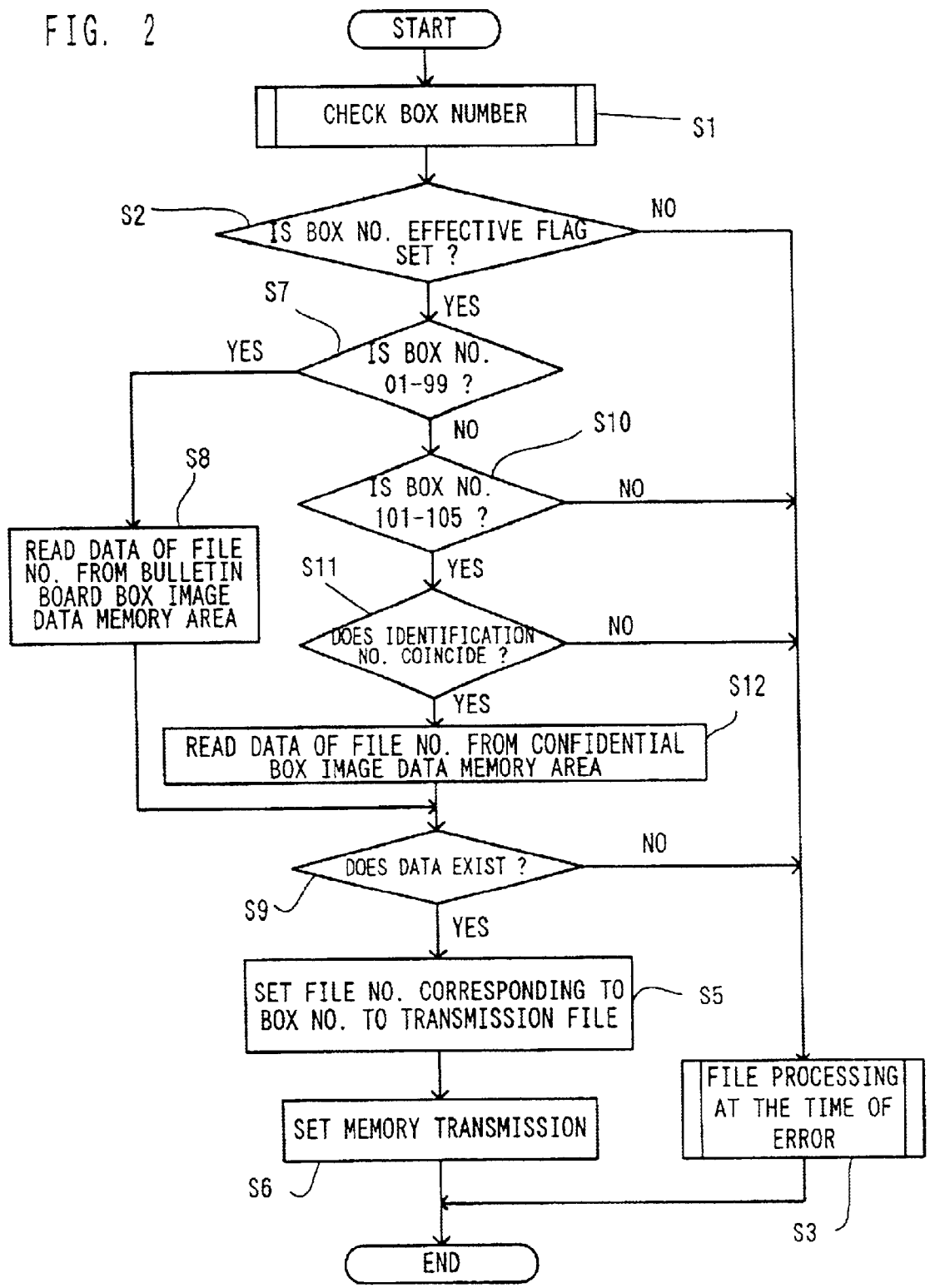
FIG. 2 is a main flowchart for showing an image transfer control processing to be executed in the facsimile device in the first embodiment.
Figure 3:
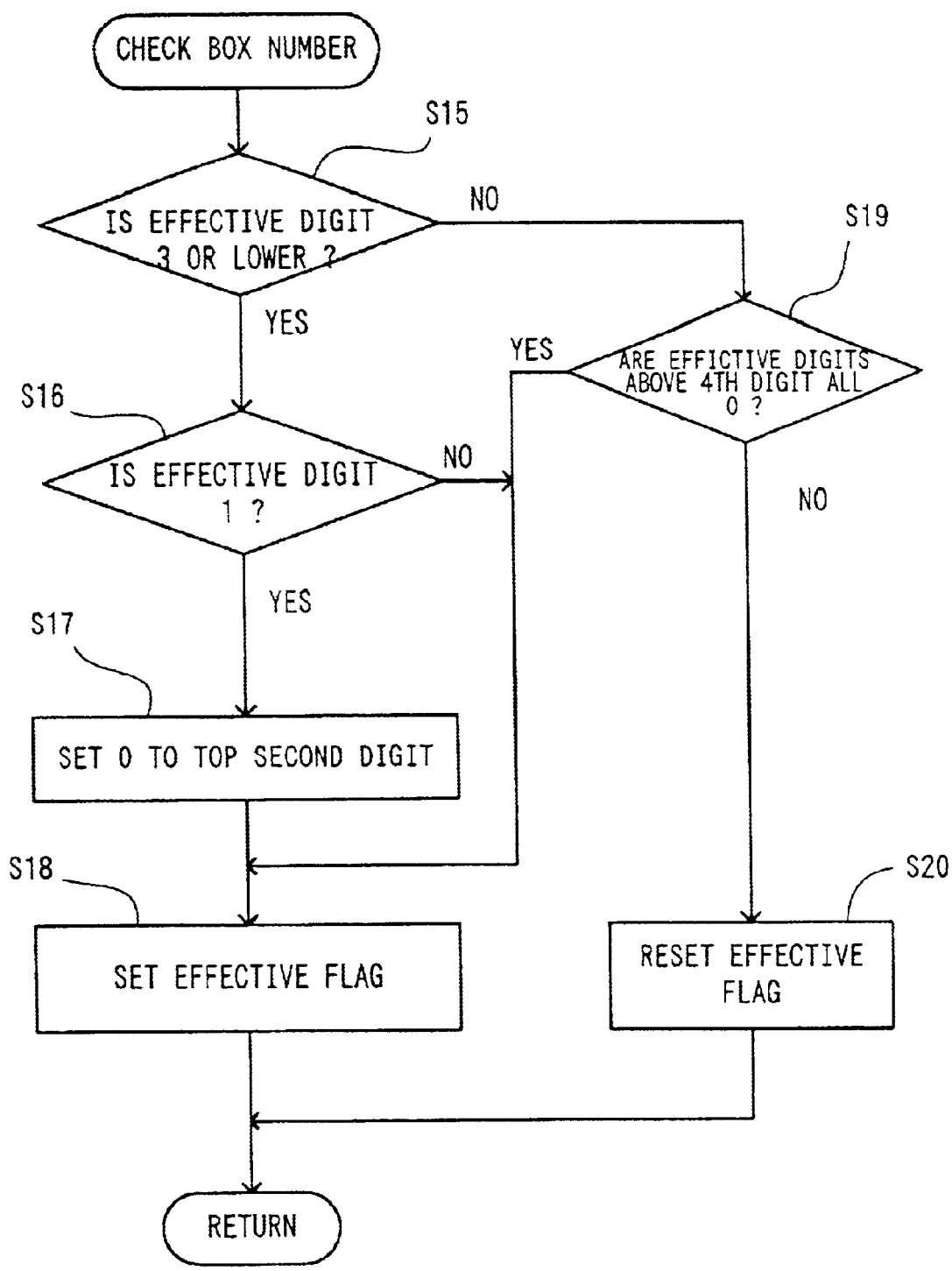
FIG. 3 is a sub-flowchart for a box number check process in the image transfer control processing to be executed in the facsimile device in the first embodiment.
Figure 4:
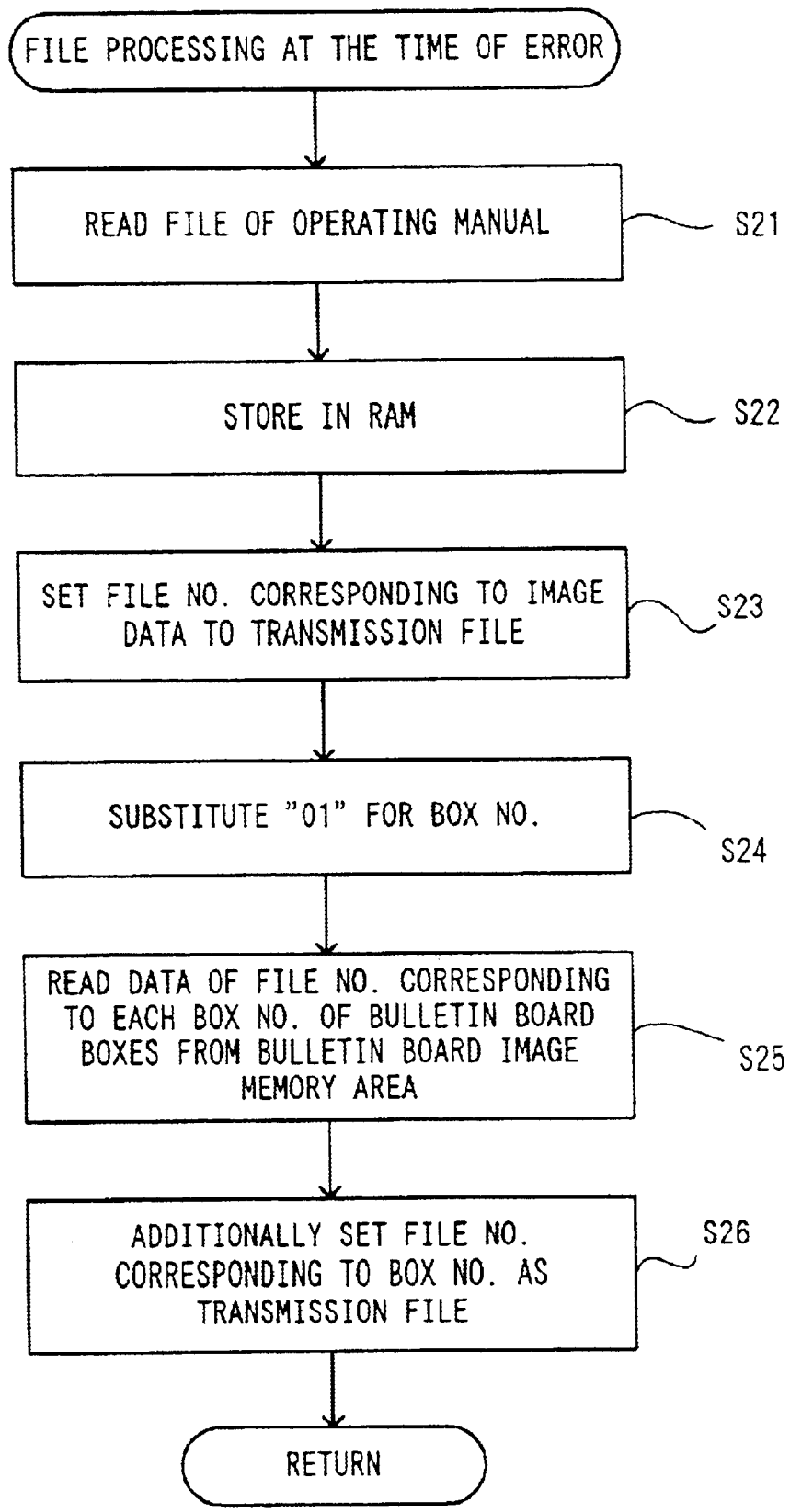
FIG. 4 is a sub-flowchart for a file processing at the time of error in the image transfer control processing.

Next, referring now to FIG. 2 through FIG. 4, image transfer processing in receiving transfer command of the facsimile device composed as above. FIG. 2 is a main flowchart for showing an image transfer control processing to be executed in the facsimile device in the first embodiment; FIG. 3 is a sub-flowchart for a box number check processing in the image transfer control processing to be executed in the facsimile device in the first embodiment; FIG. 4 is a sub-flowchart for a file processing at the time of error in the image transfer control processing.

The processing shown in FIG. 2 begins by the detection of the transfer command from the facsimile device of the calling side via NCU2, and in Step (hereinafter abbreviated as "S") 1, the necessary information contained in this transfer command is stored in RAM 3. For this required information, when the calling-side facsimile device requires transfer of image data in a bulletin board box 32, "box No." and "transfer destination, that is, telephone number of the calling side", and when the facsimile device of the calling side requests transfer of image data in the confidential box 31, "box No.", "identification No.", and "transfer destination, that is, telephone number of the calling side". These pieces of required information are configured, for example, to be instructed to enter the information in accordance with whether the caller chooses the bulletin board box or confidential box in the function setting in the calling side facsimile device.

And after the required information is stored in RAM 3, the sub-routine processing for the box No. check processing is executed.

Now, the format of a transfer command on the calling side in the present embodiment is of a type of "start code+ memory box No. (20-digit ASCII code)+identification No. (20-digit ASCII code)+telephone No. of the transfer destination+stop code". In the present embodiment, the number of effective digits of the box No. of the memory box is three and the characters that can be used are 0 to 9 numerals. The number of effective digits of the identification number is four, and the characters that can be used are #, *, and 0 to 9 numerals. The box No. of the confidential box 31 of the facsimile device in the present embodiment is a 3-digit numeral and the box No. of the bulletin board box 32 is a 2-digit numeral from "01" to "99".

In the box No. check processing (S1), the facsimile device first reads the box No. of the transfer command from RAM 3 as shown in FIG. 3, checks the number of effective digits of the box No., and judges whether it is a numeral of 3 or less digits (S15). And if the box No. is a numeral of 3 or less digits (S15: YES), it judges whether the number of effective digits is one digit or not (S16). And if the number of effective digits is not 1 digit (S16: NO), that is, if the number of effective digits is 2 or 3, the facsimile device sets the box No. effective flag stored in EEPROM6, and substitutes this 2-digit or 3-digit numeral in the box No. of the transfer command stored in RAM 3 again, and returns main processing (S18).

In S16, when the number of effective digits is 1 digit (S16: YES), that is, if it is a numeral of "1" through "9", 0 is set to the top second digit to make a 2-digit numeral of "01" through "09" (S17). And after the box No. effective flag stored in EEPROM6 is set, the facsimile device substitutes the 2-digit of this "01" to "09" again for the box No. of the transfer command stored in RAM 3 and returns to the main processing (S18).

In S15, when the number of effective digits of box No. is 4 or more (S15: NO), and if the effective digits above the 4th digit are all "0" and the 3rd digit and smaller is a numeral (S19: YES), the facsimile device sets the box No. effective flag stored in EEPROM6, and then, substitutes the numeral of the 3rd digit and below into the box No. of the transfer command stored in RAM 3, and returns to main processing (S18).

In S15, when the number of effective digits of box No. is 4 or more digits (S15: NO) and the effective digits of the fourth and above digits are all not zero, or are not numerals of 3 digits or lower (S19: NO), the facsimile device resets the box No. effective flag stored in EEPROM6, and then, returns to main process (S20).

Then, as shown in FIG. 2, the facsimile device reads the box No. effective flag from EEPROM6 and judges whether it is set or not (52). And if the box No. effective flag is not set (S2: NO), that is, when the box No. effective flag is reset, the sub-routine processing for the file processing at the time of error is executed in S3.

File processing at the time of error (S3) begins with first reading the image data indicating the operation manual from EEPROM6 as shown in FIG. 4 (S21). This operation manual is a manual for fetching registered information from the confidential box and bulletin board, and FIG. 5 shows one example.

Now, description will be made on the image data 20 shown in FIG. 5. First of all, titles "Fetching information from the confidential box" and "Fetching information from the bulletin board" are set out.

And under the title of "Fetching information from the confidential box", an operation procedure for fetching information from the confidential box is arranged sequentially from No. 1 to No. 8. At No. 1, "1. Press the function key" is recited. At No. 2, "2. (Using numeral keys,) press 1 and 0 keys" is recited. At No. 3, "3. Enter box number", under which "•box No. is a three-digit numeral from 101 to 105" is recited. At No. 4, "4. Press the set key" is recited. At No. 5, "5. Enter the identification No. and then under the message, "•Identification No. is of 4 digits", and still under the message, "•Usable characters are #, *, and numerals of 0 to 9" is recited. At No. 6, "6. Press the set key" is recited. At No. 7, "7. Specify the destination and press the set key." And below the message, "When mistake is made, press the clear key and re-enter" is recited. In addition, at No. 8, "8. Press the start key", and under this message, "Received" is to be displayed are recited. This indicates that characters of "RECEIVED" are illustrated in the display 14.

Below the title of "Fetching information from the bulletin board", an operation procedure for fetching the information from the bulletin board is arranged successively from No. 1 to No. 6. At No. 1, "1. Press the function key" is recited. At No. 2, "2. (Using numeral keys,) press 1 and 1 keys" is recited. At No. 3, "3. Enter box number", under which "•box No. is a two-digit numeral from 01 to 99" is recited. At No. 4, "4. Press the set key" is recited. At No. 5, "5. Specify the destination and press the set key" is recited. And below the message, "When mistake is made, press the clear key and re-enters is recited. In addition, at No. 6, "6. Press the start key", and under this message, "Received" is to be displayed" are recited. This indicates that characters of "RECEIVED" are illustrated in the display 14. Then, in S22, the image data 20 read out is stored in RAM 3. And file No. corresponding to this image data 20 stored in RAM 3 is set to the transmission file (S23).

Thereafter, the numeral "01" is substituted in box No. of the transfer command stored in RAM 3 (S24). And the data of file No. corresponding to each box No. of the bulletin board boxes 32 is readout from the bulletin board image data memory area 3B (S25), the file No. stored in the bulletin board box 32 of box No. that coincides with this box No. "01" is chosen, and the chosen file No. is additionally set to the transmission file and stored in RAM 3 (S26). Thereafter, the process returns to the main flow chart.

Now referring to FIG. 6, description is made on the image data registered to the bulletin board box 32 of box No. "01". FIG. 6 is an example of an image data stored in the bulletin box 32 of box No. "01" in the present embodiment.

As shown in FIG. 6, the image data 21 stored in the bulletin board box 32 of box No. "01" relates to a guide to the information registered in each memory box 31, 32 of the facsimile device according to the present embodiment. First of all, a title of "Registered contents of confidential box and bulletin board box" is set out.

And below the title of "Registered contents of confidential box and bulletin board box", sub-titles of 1. Confidential box" and "2. Bulletin board box" are set out. And below the sub-title of "1. Confidential box", a list 22 of box No. of each confidential box and the name of user of the confidential box is recited. This list 22 indicates that "the user of the confidential box 31 whose box No. is 101 is Yamada", "the user of the confidential box 31 whose box No. is 102 is Suzuki", "the user of the confidential box 31 whose box No. is 103 is Tanaka", "the user of the confidential box 31 whose box No. is 104 is Sato", and "the user of the confidential box 31 whose box No. is 105 is Yamamoto".

Below the sub-title of "2. Bulletin board box", a list 23 of box No. of each bulletin board box 32 and registered contents is recited. This list 23 indicates that "the contents of the bulletin board box 32 whose box No. is 01 is a guide to registered information", "the contents of the bulletin board box 32 whose box No. is 02 is information on new products", "the contents of the bulletin board box 32 whose box No. is 03 is information on version up", "the contents of the bulletin box 32 whose box No. is 11 is information on F code", "the contents of the bulletin board box 32 whose box No. is 12 is information on confidential function" and "the contents of the bulletin board box 32 whose box No. is 13 is information on bulletin board function".

In addition, below this list 23, it is stated that "* those with data registered only are recited.".

Then, after executing the sub-routing processing of the file processing at the time of error (S3), memory transmission of the transmission file is set (S6).

In S2, when the box No. effective flag is set (S2: YES), then, box No. of the transfer command is read from RAM 3, and whether it is 2-digit numeral or not, that is, whether it is a numeral from "01" to "99" or not is judged (S7). And when the box No. is a numeral from "01" to "99" (S7: YES), the data of file No. corresponding to each box No. of the bulletin board box 32 is read from the bulletin board image data memory area 3B (S8), and it is judged whether there is a file No. of the image data stored in the bulletin board box 32 of box No. that coincides with the above read box No. (S9). And if there is the file No. of the image data stored in this bulletin board box 32 (S9: YES), the file No. is chosen and stored in RAM 3 as a transmission file (S5). Thereafter, the memory transmission of the transmission file is set (S6).

In S9, if there is no file No. of the image data stored in this bulletin board box 32 (S9: NO), the sub-routine processing for the file processing at the time of error (S3) is executed, and then, memory transmission of the transmission file is set (S6).

Next, in S7, if box No. of the transfer command read from RAM 3 is not a two-digit number from "01" to "99" (S7: NO), it is judged whether the box No. is a numeral from "101" to "105", (S10). And if this box No. is not a numeral from "101", to "105" (S10: NO), the sub-routine processing for the file processing at the time of error (S3) is executed, and then, memory transmission of the transmission file is set (S6).

In S10, if box No. of the transfer command read from RAM 3 is a numeral from "101" to "105" (S10: YES), the identification number of the transfer command is read from RAM 3, and whether this identification number coincides with the identification number of the confidential box 31 accompanied with the box No. that coincides with the box No. of the transfer command is judged (S11). And if the identification No. of the transfer command does not coincide with the identification No. of this confidential box 31 (S11: NO), the sub-routine processing for the file processing at the time of error (S3) is executed, and then, memory transmission of the transmission file is set (S6).

In S11, if the identification No. of the transfer command coincides with the identification No. of the confidential box 31 (S11: YES), the data of file No. corresponding to each box No. of confidential box 31 is read from the confidential image data memory area 3A (S12), and it is judged whether or not there is a file No. of the image data stored in the confidential box 31 accompanied with box No. that coincides with the box No. of transfer command (S9). And if there is a file No. of the image data stored in this confidential box 31 (S9: YES), the file No. is chosen and stored in RAM 3 as a transmission file (S5). Thereafter, memory transmission of this transmission file is set (S6).

In S9, if there is no file No. of the image data stored in the confidential box 31 (S9: NO), the sub-routine processing for the file processing at the time of error (S3) is executed, and then, memory transmission of the transmission file is set (S6).

In the facsimile device according to the present embodiment as described above in detail, when a transfer command from the calling side is detected, for example, if the transfer command is to request transfer of registered data of the bulletin board box 32, "box No. of memory box" and "telephone No. of destination" of this transfer command are stored in RAM 3, and the effectiveness of "box No. of memory box", that is, adequacy of the specification method is judged, and if the "box No. of memory box" is a 1-digit numeral from "01" to "99", 0 is set to the top second digit, and is stored in "box No. of memory box" of RAM 3 again as a 2-digit numeral of "01" to "09" and the box No. effective flag of EEPROM6 is set. Thereafter, if box number is effective and is the box number of the bulletin board box 32 to which the image data is registered (S7: YES, S9: YES), the image data registered to this bulletin box 32 is memory-transmitted to the calling side (S5, S6). If transfer of the registered data of the confidential box 31 is requested, the "identification number" is further contained in the transfer command, and if box No. is effective and is the box No. of confidential box 31 and at the same time the identification No. coincides (S11: YES, S11: YES), the image data registered to this confidential box 31 is memory-transmitted to the calling side (S5, S6). In addition, if the specifying method of "box No. of memory box" in the transfer command transmitted from the calling side is wrong (S2: NO), or if the image data is not registered in the memory box accompanied with the corresponding box No. (S9; NO), or if the "identification No." of the transfer command is wrong (S11: NO), the sub-routine processing for the file processing at the time of error (S3) is executed. And, the image data 20 showing the operation manual to fetch registered information from the confidential box as well as bulletin board box and the image data 21 showing "a guide to registered information" of each memory box stored in the bulletin board box 32 whose box No. is "01" are transferred to the calling side (S3, S6).

Consequently, if any error occurs when the registered data is fetched from the confidential box 31 and bulletin board box 32, the calling side is able to learn that the error is not caused by circuit failure but is based on the mistakes in the method of specifying the transfer command, etc. If the method of specifying box No. and identification No. of the transfer command is not correct, it is possible to easily modify the specified box No. and identification No. of the transfer command in accordance with the operation manual 20, and at the same time, on the basis of the correct information such as registered contents, etc. of each memory box 31, 32, it is possible to correctly specify box No. etc. of memory box in which the desired image data is stored. In addition, if the box No. specified in the transfer command is a 1-digit numeral from "1" to "9", 0 is set to the top second digit of the box No. to make a 2-digit numeral of "01" to "09" and the effectiveness of the method of specifying the box No. is judged, this kind of mistake in entry of box No. is not judged to be an error. The calling side is able to decisively receive the image data registered in the memory box accompanied with the 2-digit box No. that corresponds to the 1-digit box No. specified in the transfer command.

Next, a second embodiment of a facsimile device according to the present invention will be described. The structure of the facsimile device in the second embodiment is substantially the same as that in the first embodiment, and its detailed description is omitted in the present embodiment. Like elements corresponding to those in the first embodiment are indicated by like numerals.

Figure 8:
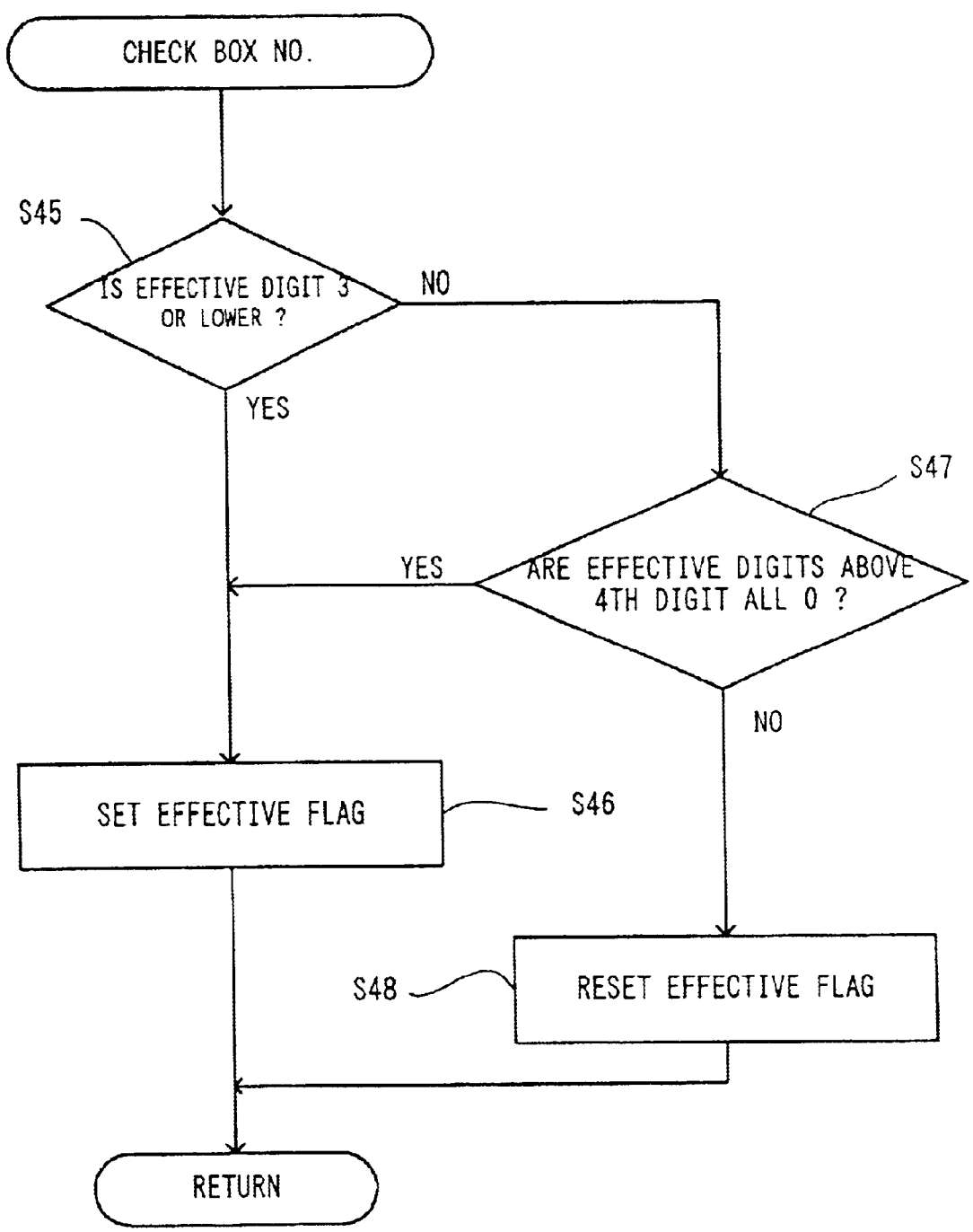
FIG. 8 is a sub-flowchart for a box number check processing in the image transfer control processing in the second embodiment.

Description is made on the image transfer processing in receiving transfer command of the facsimile device, with reference to FIGS. 7 and 8. FIG. 7 is a main flowchart showing an image transfer control procedures in the facsimile device in the second embodiment. FIG. 8 is a sub-flowchart for a box number check processing in the image transfer control procedures in the second embodiment.

The processing shown in FIG. 7 begins by the detection of the transfer command from the facsimile device of the calling side via NCU 2, and in S31, the necessary information contained in this transfer command is stored in RAM 3. For this required information, when the calling-side facsimile device requires a transfer of image data in a bulletin board box 32, "box No." and "transfer destination, that is, telephone number of the calling side", and when the facsimile device of the calling side requests transfer of image data in the confidential box 31, "box No.", "identification No.", and "transfer destination, that is, telephone number of the calling side". These pieces of required information are configured, for example, to be instructed to enter the information in accordance with whether the caller chooses the bulletin board box or confidential box in the function setting in the calling side facsimile device.

And after the required information is stored in RAM 3, the sub-routine processing for the box No. check processing is executed.

Now, the format of a transfer command on the calling side in the present embodiment is of a type of "start code+memory box No. (20-digit ASCII code)+identification No. (20-digit ASCII code)+telephone No. of the transfer destination+stop code". In the present embodiment, similarly to the first embodiment, the number of effective digits of the box No. of the memory box is three and the characters that can be used are 0 to 9 numerals. The number of effective digits of the identification number is four, and the characters that can be used are #, *, and 0 to 9 numerals. The box No. of the confidential box 31 of the facsimile device in the present embodiment is a 3-digit numeral and the box No. of the bulletin board box 32 is a 2-digit numeral from "01" to "99".

In the box No. check processing (S31), the facsimile device first reads the box No. of the transfer command from RAM 3 as shown in FIG. 8, checks the number of effective digits of the box No., and judges whether it is a numeral of 3 or less digits (S45). And if the box No. is a numeral of 3 or less digits (S45: YES), the facsimile device sets the box No. effective flag stored in EEPROM6, and substitutes this 3-digit numeral in the box No. of the transfer command stored in RAM 3 again, and returns main processing (S48). When the number of effective digits of box No. is 4 or more (S45: NO), and if the effective digits above the 4th digit are all 0 and the 3rd digit and smaller is a numeral (S47: YES), the facsimile device sets the box No. effective flag stored in EEPROM6, and then, substitutes this 3-digit numeral into the box No. of the transfer command stored in RAM 3, and returns to main processing (S46) When the number of effective digits of box No. is 4 or more digits (S45: NO) and the effective digits of the fourth and above digits are all not zero, or are not numerals of three digits or lower (S47: NO), the facsimile device resets the box No. effective flag stored in EEPROM6, and then, returns to main process (S48). Then, as shown in FIG. 7, the facsimile device reads the box No. effective flag from EEPROM 6 and judges whether it is set or not (S32). And if the box No. effective flag is not set (S32: NO), the numeral "01" is substituted in box No. of the transfer command stored in RAM 3 (S33). And the data of file No. corresponding to each box No. of the bulletin board boxes 32 is read out from the bulletin board image data memory area 3B (S34), the file No. stored in the bulletin board box 32 of box No. that coincides with this box No. "01" is chosen, and the chosen file No. is additionally set to the transmission file and stored in RAM3 (S35). Thereafter, the process returns to the main flow chart.

Alternatively, when the box No. effective flag is set (S32: YES), then, box No. of the transfer command is read from RAM 3, and whether it is 2-digit numeral or not, that is, whether it is a numeral from "01" to "99" or not is judged (S37). And when the box No. is a numeral from "01" to "99" (S37: YES), the data of file No. corresponding to each box No. of the bulletin board box 32 is read from the bulletin board image data memory area 3B (S38), and it is judged whether there is a file No. of the image data stored in the bulletin board box 32 with the box No. which is coincident with the above read box No. (S39). And if there is the file No. of the image data stored in this bulletin board box 32 (S39: YES), the file No. is chosen and stored in RAM 3 as a transmission file (S35). Thereafter, the memory transmission of the transmission file is set (S36).

In S39, if there is no file No. of the image data stored in the bulletin board box 32 (S39: NO), a numeral "01" is substituted in the box No. of the transfer command stored in RAM 3 (S33). And the data of file No. corresponding to each box No. of the bulletin board boxes 32 is read out from the bulletin board image data memory area 3B (S34), the file No. stored in the bulletin board box 32 with the box No. that coincides with the box No. "01" is chosen, and the chosen file No. is stored in RAM 3 as the transmission file (S35). Thereafter, the process returns to the main flow chart. Then, memory transmission of the transmission file is set (S36).

Next, in S37, if box No. of the transfer command read from RAM 3 is not a two-digit number from "01" to "99" (S37: NO), it is judged whether the box No. is a numeral from "101" to "105" (S40). And if this box No. is not a numeral from "101", to "105" (S40: NO), a numeral "01" is substituted in the box No. of the transfer command stored in RAM 3 (S33). And the data of file No. corresponding to each box No. of the bulletin board boxes 32 is read out from the bulletin board image data memory area 3B (S34), the file No. stored in the bulletin board box 32 with the box No. that coincides with the box No. "01" is chosen, and the chosen file No. is stored in RAM 3 as the transmission file (S35). Thereafter, the process returns to the main flow chart. Then, memory transmission of the transmission file is set (S36).

In S40, if box No. of the transfer command read from RAM 3 is a numeral from "101" to "105" (S40: YES), the identification number of the transfer command is read from RAM 3, and whether this identification number coincides with the identification number of the confidential box 31 accompanied with the box No. that coincides with the box No. of the transfer command is judged (S41). And if the identification No. of the transfer command does not coincide with the identification No. of this confidential box 31 (S41: NO), a numeral "01" is substituted in the box No. of the transfer command stored in RAM 3 (S33). And the data of file No. corresponding to each box No. of the bulletin board boxes 32 is read out from the bulletin board image data memory area 3B (S34), the file No. stored in the bulletin board box 32 with the box No. that coincides with the box No. "01" is chosen, and the chosen file No. is stored in RAM 3 as the transmission file (S35). Thereafter, the process returns to the main flow chart. Then, memory transmission of the transmission file is set (S36).

In S41, if the identification No. of the transfer command coincides with the identification No. of the confidential box 31 (S41: YES), the data of file No. corresponding to each box No. of confidential box 31 is read from the confidential image data memory area 3A (S42), and it is judged whether or not there is a file No. of the image data stored in the confidential box 31 accompanied with box No. that coincides with the box No. of transfer command (S39). And if there is a file No. of the image data stored in this confidential box 31 (S39: YES), the file No. is chosen and stored in RAM 3 as a transmission file (S35) Thereafter, memory transmission of this transmission file is set (S36).

When there is no file No. of the image data stored in the confidential box 31 (S39: NO), a numeral "01" is substituted in the box No. of the transfer command stored in RAM 3 (S33). And the data of file No. corresponding to each box No. of the bulletin board boxes 32 is read out from the bulletin board image data memory area 3B (S34), the file No. stored in the bulletin board box 32 with the box No. that coincides with the box No. "01" is chosen, and the chosen file No. is stored in RAM 3 as the transmission file (S35). Thereafter, the process returns to the main flow chart. Then, memory transmission of the transmission file is set (S36).

Now, description will be made on the image data 40 stored in the bulletin board box 32 with the box. No. "01" with reference to FIG. 9.

As shown in FIG. 9, the image data 40 stored in the bulletin board box 32 with the box. No. "01" relates to a method of fetching information in the facsimile device in the second embodiment. In the data, there are provided titles "Method of fetching information from the confidential box and bulletin board box" and "Registered contents in confidential box and bulletin board box". Under the title of "Method of fetching information from the confidential box and bulletin board box", there are provided sub-titles; "1. Fetching information from the confidential box" and "2. Fetching information from the bulletin board box". Under the sub-title "1. Fetching information from the confidential box," the text "Specify the box number (101–105) and identification number (X X X X)" is recited. Under the sub-title "2. Fetching information from the bulletin board box", the text "Specify the box number (01–99)" and under the message, "✗ Usable characters for the box number are #, *, and numerals of 0 to 9" and "✗ Usable characters for the identification number are #, *, and numerals of 0 to 9" are recited.

And below the title of "Registered contents of confidential box and bulletin board box", sub-titles of "1. Confidential box" and "2. Bulletin board box" are set out. And below the sub-title of "1. Confidential box", a list 41 of box No. of each confidential box and the name of user of the confidential box is recited. This list 41 indicates that "the user of the confidential box 31 whose box No. is 101 is Yamada", "the user of the confidential box 31 whose box No. is 102 is Suzuki", "the user of the confidential box 31 whose box No. is 103 is Tanaka", "the user of the confidential box 31 whose box No. is 104 is Sato", and "the user of the confidential box 31 whose box No. is 105 is Yamamoto".

Below the sub-title of "2. Bulletin board box", a list 42 of box No. of each bulletin board box 32 and registered contents is recited. This list 42 indicates that "the contents of the bulletin board box 32 whose box No. is 01 is a method of fetching information", "the contents of the bulletin board box 32 whose box No. is 02 is information on new products", "the contents of the bulletin board box 32 whose box No. is 03 is information on version up", and "the contents of the bulletin box 32 whose box No. is 11 is information on F code", "the contents of the bulletin board box 32 whose box No. is 12 is information on confidential function", and "the contents of the bulletin board box 32 whose box No. is 13 is information on bulletin board function.". In addition, below this list 42, it is stated that "* those with data registered only are recited.".

In the facsimile device according to the second embodiment as described above in detail, when a transfer command from the calling side is detected, for example, if the transfer command is to request transfer of registered data of the bulletin board box 32, "box No. of memory box" and "telephone No. of destination" of this transfer command are stored in RAM 3, and the effectiveness of "box No. of memory box", that is, adequacy of the specification method is judged in the box number check processing (S31). If the box number is effective and is the box number of the bulletin board box 32 to which the image data is registered (S37: YES, S39: YES), the image data registered to this bulletin box 32 is memory-transmitted to the calling side (S35, S36). If transfer of the registered data of the confidential box 31 is requested, the "identification number" is further contained in the transfer command, and if box No. is effective and is the box No. of confidential box 31 and at the same time the identification No. coincides (S40: YES, S41: YES), the image data registered to this confidential box 31 is memory-transmitted to the calling side (S35, S36). In addition, if the specification method of " box No. of memory box" of transfer command from the calling side is wrong (S32: NO) or if the image data is not registered in the memory box accompanied with the corresponding box No. (S39: NO), or if the "identification No." of transfer command is wrong (S41: NO), the image data indicating "Method of fetching information" registered in the bulletin board box 32 with the box No. "01" is transferred to the calling side (S33–S36).

Consequently, if the specification method of the transfer command is wrong, the calling side can know information on correct specification method relating to the number of digits of box No. and usable characters therefor, so that the calling side is able to learn that the error caused in fetching information is not caused by circuit failure but is based on the mistakes in the method of specifying the transfer command, etc. In addition, the calling side can correct the mistakes in the specification method, for example, the box No., thereby to surely obtain the image data stored in the desired memory box of the relevant facsimile device.

If the method of specifying box No. of the transfer command is not correct, or the image data is not stored in the memory box with the box No. that coincides with the box No. specified by the transfer command, the calling side can obtain correct information related to the box no. accompanied to each memory boxes 31 and 32 and the registered contents therein in the relevant facsimile device to modify the box No. of the transfer command. Thus, the image data stored in the desired memory box can be provided.

If the number of digits of the identification No. of the confidential box 31 specified by the transfer command is wrong, the calling side can know correct information on the number of digits of the identification No. accompanied to the confidential box 31 and usable characters, etc. in the relevant facsimile device, and can modify the identification No. of the confidential box 31 specified by the transfer command. Thus, the image data stored in the desired confidential box 31 can be surely provided.

Furthermore, the facsimile device in the embodiment stores the image data on the method of fetching information in the bulletin board box 32 with the box No. "01". It is possible for a plurality of users for the facsimile device to freely add or modify the registered contents in the bulletin board box, thereby to always provide up-to-date registered contents stored in each memory box. Plural persons can also freely access the memory box.

Next, a third embodiment of a facsimile device according to the present invention will be described hereinafter. The structure of the facsimile device in the second embodiment is substantially the same as that in the first embodiment, its detailed description is omitted in this embodiment. Like elements corresponding to those in the first embodiment are indicated by like numerals.

In the third embodiment, EEPRM 6 serves as a message data memory for storing a plurality of message data. CPU 1 also serves a transfer data setting device for setting transfer data in accordance with the message data.

Description is made on the image transfer processing in receiving transfer command of the facsimile device, with reference to FIGS. 7 to 11.

Figure 10:
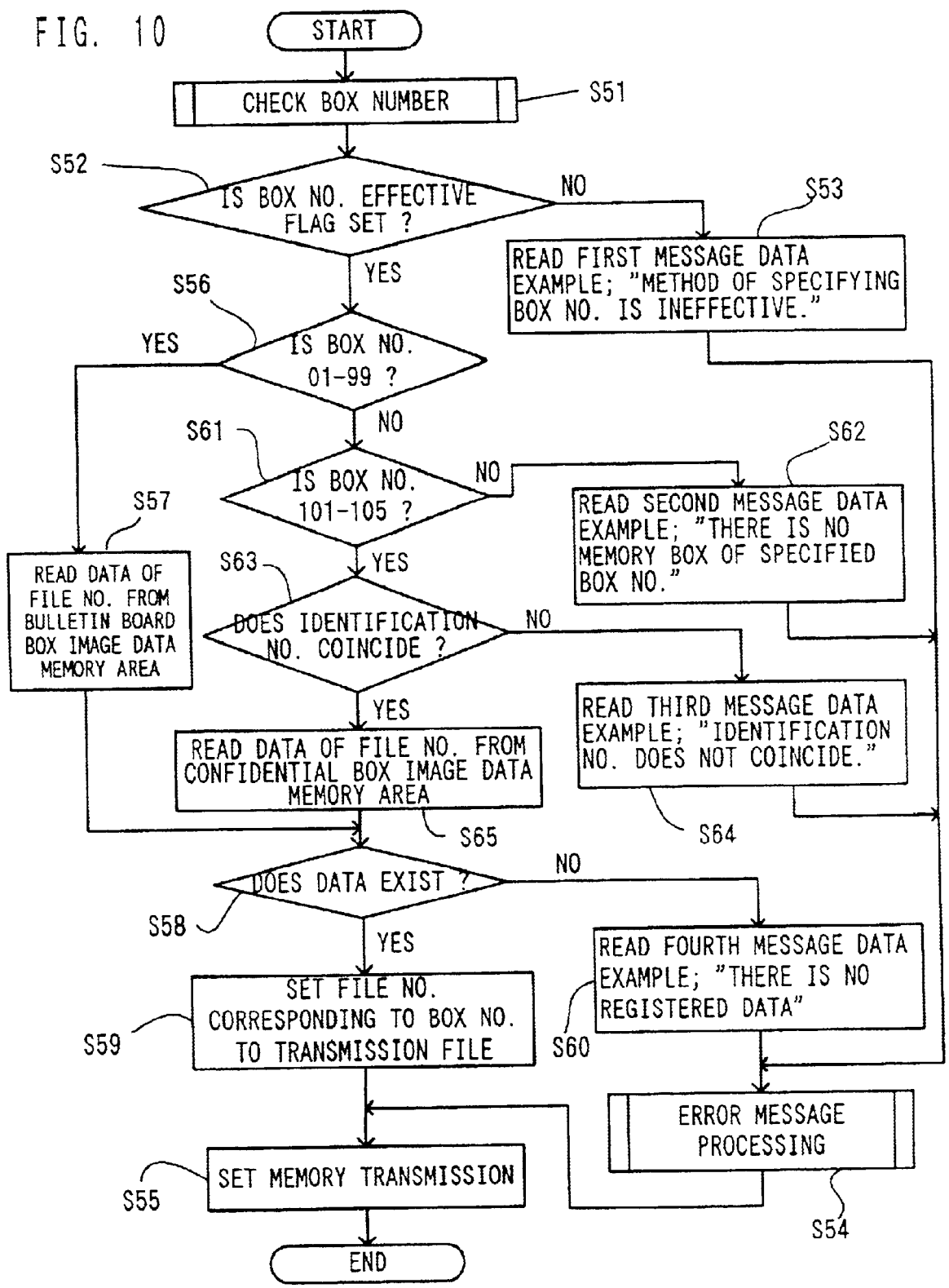
FIG. 10 is a main flowchart for an image transfer control processing in a facsimile device in a third embodiment according to the present invention.
Figure 11:
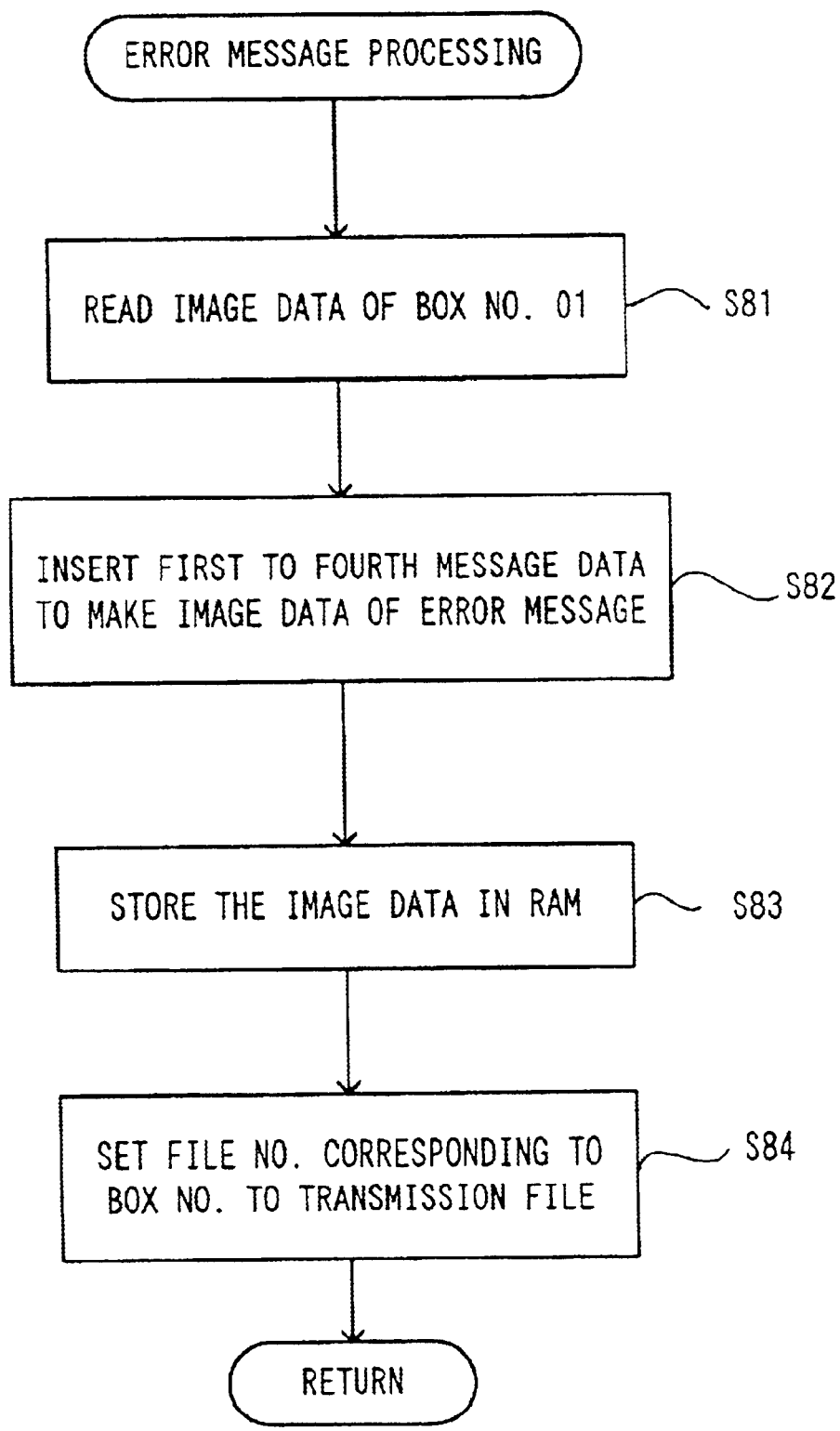
FIG. 11 is a sub-flowchart for an error message processing in the image transfer control processing in the third embodiment.

FIG. 10 is a main flowchart showing an image transfer control procedures in the facsimile device in the third embodiment. FIG. 11 is a sub-flowchart for an error message processing in the image transfer control procedures in the third embodiment.

It is to be noted that a box number check processing in the image transfer control procedures in the third embodiment is the same as in the second embodiment, and the description is made with reference to FIG. 8. Similarly, the image data stored in the bulletin board box 32 with the box No. "01" in the third embodiment is the same as in the second embodiment, and its one example is described with reference to FIG. 9.

As shown in FIG. 10, in S51, first, when the transfer command from the facsimile device of the calling side is detected via NCU 2, "box No." and "transfer destination, that is, telephone number of the calling side" of the transfer command are stored in RAM 3, and the sub-routine processing for the box No. check processing is executed.

It is to be noted that the format of a transfer command on the calling side in the present embodiment is, similar to those in the first and second embodiment, of a type of "start code+memory box No. (20-digit ASCII code)+identification No. (20-digit ASCII code)+telephone No. of the transfer destination+stop code". The number of effective digits of the box No. of the memory box is three and usable characters therefor are numerals "0" to "9". The number of effective digits of the identification number is four, and usable characters therefor are #, *, and 0 to 9 numerals. The box No. of the confidential box 31 of the facsimile device in the present embodiment is a 3-digit numeral and the box No. or the bulletin board box 32 is a 2-digit from "01" to "99".

The box No. check processing (S51) is executed in the same manner as in the second embodiment. Specifically, as shown in FIG. 8, the facsimile device first reads the box No. of the transfer command from RAM 3, checks the number of effective digits of the box No., and judges whether it is a numeral of 3 or less digits (S45). And if the box No. is a numeral of 3 or less digits (S45: YES), the facsimile device sets the box No. effective flag stored in EEPROM6, and substitutes this 3-digit numeral in the box No. of the transfer command stored in RAM 3 again, and returns main processing (S48).

When the number of effective digits of box No. is 4 or more (S45: NO), and if the effective digits above the 4th digit are all 0 and the 3rd digit and smaller is a numeral (S47: YES), the facsimile device sets the box No. effective flag stored in EEPROM6, and then, substitutes this 3-digit numeral into the box No. of the transfer command stored in RAM 3, and returns to main processing (S46).

When the number of effective digits of box No. is 4 or more digits (S45: NO) and the effective digits of the fourth and above digits are all not zero, or are not numerals of three digits or lower (S47: NO), the facsimile device resets the box No. effective flag stored in EEPROM6, and then, returns to main process (S48).

Then, as shown in FIG. 10, the facsimile device reads the box No. effective flag from EEPROM 6 and judges whether it is set or not (S52). And if the box No. effective flag is not set (S52: NO), a first message to notify that the method of specifying the box No. is ineffective is selected and read from EEPROM 6 (S53). This first message is, for instance, the message data that "the method of specifying the box No. is ineffective.".

Subsequently, the sub-routine processing for an error message processing (S54) is executed. In this error message processing (S54), as shown in FIG. 11, the facsimile device first reads the image data of the bulletin board box 32 with the box No. "01" (S81). This image data is the image data indicating the method of fetching information. An example thereof is shown in FIG. 9. It is to be noted that a detailed description of the image data shown in FIG. 9 is referred to the second embodiment and is omitted in the present embodiment.

In the present embodiment, furthermore, the first message data is inserted in the first part of the image data 40 read from the bulletin board box 32 with the box. No. "01" to make the image data for the error message (S82). This image data including the first message is stored in RAM 3 (S83). The file No. of the image data stored in RAM 3 is set in a transmission file and, then, the process is returned to the main flowchart (S84). Thereafter, memory transmission of the transmission file is set (S55).

Meanwhile, when the box No. effective flag is set (S52: YES), then, box No. of the transfer command is read from RAM 3, and whether it is 2-digit numeral or not, that is, whether it is a numeral from "01" to "99" or not is judged (S56). And when the box No. is a numeral from "01" to "99" (S56: YES), the data of file No. corresponding to each box No. of the bulletin board box 32 is read from the bulletin board image data memory area 3B (S57) and it is judged whether there exists a file No. of the image data stored in the bulletin board box 32 of box No. which is coincident with the above read box No. (S58). And if there is the file No. of the image data stored in this bulletin board box 32 (S58: YES), the file No. is chosen and stored in RAM 3 as a transmission file (S59). Thereafter, the memory transmission of the transmission file is set (S55).

In S58, if there is no file No. of the image data stored n the bulletin board box 32 (S58: NO), a fourth message data to indicate that no image data is stored in the memory box of the specified box No. is selected and read from EEPROM 6 (S60). This fourth message data is, for instance, the message data that "There is no registered data.".

And the sub-routine processing for the error message processing (S54) is executed. The image data of the bulletin board box 32 with the box. No. "01" is read (S81). The fourth message data is inserted in the first part of the image data 40 read from the bulletin board box 32 with the box. No. "01", to make the image data for the error message (S82). This image data including the fourth message is stored in RAM 3 (S83). The file No. of the image data stored in RAM 3 is set in a transmission file and, then, the process is returned to the main flowchart (S84). Thereafter, memory transmission of the transmission file is set (S55).

Next, if box No. of the transfer command read from RAM 3 is not a two-digit number from "01" to "99" (S56: NO), it is judged whether the box No. is a numeral from "101" to "105" (S61). And this box No. is not a numeral from "101" to "105", (S61: NO), a second message data to indicate that no memory box with the specified box No. is selected and read from EEPROM 6 (S62). This second message data is, for instance, the message data that "There is no memory box with the specified box No.".

Subsequently, the sub-routine processing for the error message processing (S54) is executed. The image data of the bulletin board box 32 with the box. No. "01" is read (S81). The second message data is inserted in the first part of the image data 40 read from the bulletin board box 32 with the box. No. "01" to make the image data for the error message (S82). This image data including the second message is stored in RAM 3 (S83). The file No. of the image data stored in RAM 3 is set in a transmission file and, then, the process is returned to the main flowchart (S84). Thereafter, memory transmission of the transmission file is set (s55).

If box No. of the transfer command read from RAM 3 is a numeral from "101" to "105", (S61: YES), the identification No. of the transfer command is read from RAM 3, and whether this identification No. coincides with the identification No. of the confidential box 31 accompanied with the box No. that coincides with the box No. of the transfer command is judged (S63). And if the identification No. of the transfer command does not coincide with the identification No. of this confidential box 31 (S63: NO), a third message data to indicate that the identification No. of the transfer command does not coincide with the identification No. of the confidential box 31 is selected and read from EEPROM 6 (S64). This third message data is, for instance, the message data that "The identification No. does not coincides.".

Subsequently, the sub-routine processing for the error message processing (S54) is executed. The image data of the bulletin board box 32 with the box. No. "01" is read (S81). The third message data is inserted in the first part of the image data 40 read from the bulletin board box 32 with the box. No. "01" to make the image data for the error message (S82). This image data including the third message is stored in RAM 3 (S83). The file No. of the image data stored in RAM 3 is set in a transmission file and, then, the process is returned to the main flowchart (S84).

Thereafter, memory transmission of the transmission file is set (S55).

If the identification No. of the transfer command coincides with the identification No. of the confidential box 31 (S63: YES), the data of file No. corresponding to each box No. of confidential box 31 is read from the confidential image data memory area 3A (S65), and it is judged whether or not there is a file No. of the image data stored in the confidential box 31 accompanied with box No. that coincides with the box No. of transfer command (S58). And if there is a file No. of the image data stored in this confidential box 31 (S58: YES), the file No. is chosen and stored in RAM 3 as a transmission file (S59). Thereafter, memory transmission of this transmission file is set (S55).

When there is no file No. of the image data stored in the confidential box 31 (S58: NO), the fourth message data to indicate that no image data is stored in the memory box of the specified box No. is selected and read from EEPROM 6 (S60). This fourth message data is, for instance, the message data that "There is no registered data.".

And the sub-routine processing for the error message processing (S54) is executed. The image data of the bulletin board box 32 with the box. No. "01", is read (S81). The fourth message data is inserted in the first part of the image data 40 read from the bulletin board box 32 with the box. No. "01" to make the image data for the error message (S82). This image data including the fourth message is stored in RAM 3 (S83). The file No. of the image data stored in RAM 3 is set in a transmission file and, then, the process is returned to the main flowchart (S84). Thereafter, memory transmission of the transmission file is set (S55).

In the facsimile device according to the third embodiment as described above in detail, when a transfer command from the calling side is detected, for example, if the transfer command is to request transfer of registered data of the bulletin board box 32, "box No. of memory box" and "telephone No. of destination" of this transfer command are stored in RAM3, and the effectiveness of "box No. of memory box", that is, adequacy of the specification method is judged in the box number check processing (S51). If the box number is effective and is the box number of the bulletin board box 32 to which the image data is registered (S56: YES, S58: YES), the image data registered to this bulletin box 32 is memory-transmitted to the calling side (S59, S55). If transfer of the registered data of the confidential box 31 is requested, the "identification number" is further contained in the transfer command, and if box No. is effective and is the box No. of confidential box 31 and at the same time the identification No. coincides (S61: YES, S63: YES), the image data registered to this confidential box 31 is memory-transmitted to the calling side (S59, S55).

If the specification method of "box No. of memory box" in the transfer command transmitted from the calling side is wrong (S52: NO), the first message data to the effect that the method of specifying the box No. is ineffective is inserted in the first part of the image data 40 of the bulletin board box 32 of the box No. "01 " and, this image data is transferred to the calling side (S53, S54, and S55). If there is no memory box accompanied with the "box No. of memory box" of the transfer command (S61: No), the second message data to the effect that there is no memory box assigned the specified box No. is inserted in the first part of the image data 40 of the bulletin board box 32 of the box. No. "01". This image data is then transferred to the calling side (S62, S54, and S55).

If the "identification No." of the transfer command is not correct (S63: No), the third message data to the effect that the identification No. of the transfer command does not coincide with the identification No. of the confidential box specified is inserted in the first part of the image data 40 of the bulletin board box 32 of the box. No. "01" and, then, this image data is transferred to the calling side (S64, S54, and S55).

Furthermore, it no image data is registered in the memory box accompanied with the relevant box No. (S58: No), the fourth message data to the effect that no image data is stored in the memory box of the specified box No. is inserted in the first part of the image data 40 of the bulletin board box 32 of the box No. "01" and, then, this image data is transferred to the calling side (S60, S54, and S55).

Consequently, even when any error is caused when registered data is fetched from the confidential box 31 or the bulletin board box 32, the calling side is able to learn that the error is not caused by circuit failure but is based on the mistakes in the method of specifying the transfer command, etc. and to obtain correct information on the method of specifying the number of digits of box No. and usable characters. In addition, the calling side can correct the mistakes in the specification method, for example, the box No., thereby to surely obtain the image data stored in the desired memory box of the relevant facsimile device.

Alternatively, the calling side can learn that the error is not caused by circuit failure but is based on that there is no memory box accompanied with the box No. and identification No. that coincide with the box No. and the identification No. specified by the transfer command. The calling side can obtain the information such as the list of the box number assigned to each memory box and the list of registered contents, so that the calling side can modify the mistakes of the box No. and the identification No. Thus, the image data stored in the desired memory box of the relevant facsimile device can be provided.

Furthermore, the calling side can learn that no image data is registered in the memory box accompanied with the box No. specified by the transfer command and obtain the information such as the list or the like of the registered contents in each memory box at the same time. It is therefore possible for the calling side to surely obtain the image data stored in the desired memory box of the relevant facsimile device.

Further referring to drawings, the fourth embodiment of a facsimile device according to the present invention will be described in detail.

Figure 12:
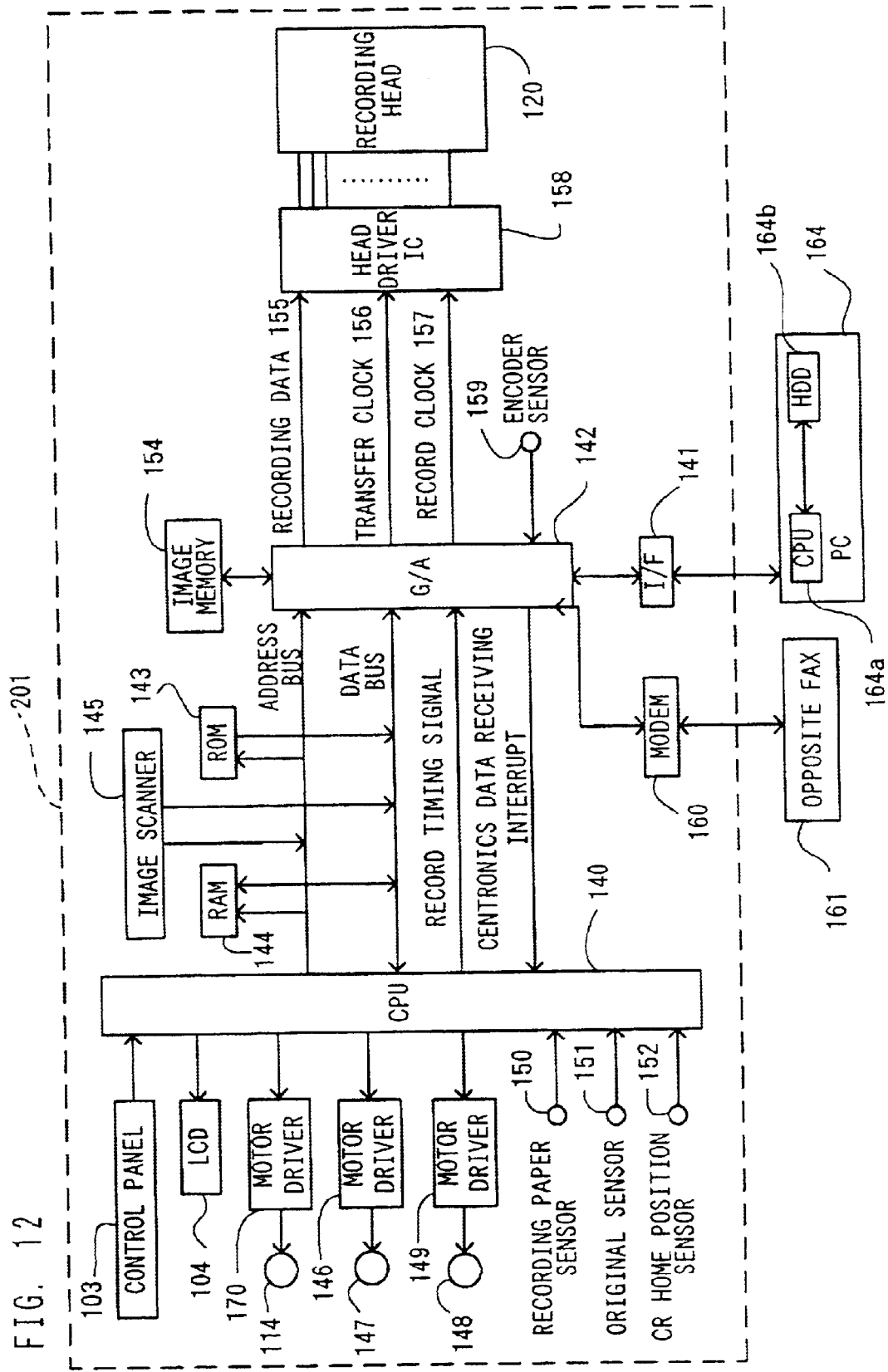
FIG. 12 is a block diagram of a control system of a communication device in a fourth embodiment according to the present invention.

FIG. 12 is a block diagram of a main control system of the facsimile device in the fourth embodiment. It is to be noted that the facsimile device in the following embodiments relates a communication device for providing information to a facsimile device of the side requesting transmission of the information.

To the communication device 101, there is equipped CPU 40 which carries out communication control such as an F code bulletin board communication carried out with the facsimile device 161 on the side requiring transmission of information (hereinafter called the "opposite facsimile device"), regular facsimile communication, audio guide, etc., reading control when an image scanner 145 reads the image information of text, recording control when a recording head 120 records on recording paper, input and output control of data carried out with PC (personal computer) 164 connected to the communication device 101.

In addition, to the communication device 101, a communication modem 160 for receiving facsimile data transmitted from the opposite facsimile device 161, and a gate array 142 for developing the facsimile data received by the communication model 160 or recording data outputted from PC 164 and inputted via the interface 141 are equipped.

Figure 13A:
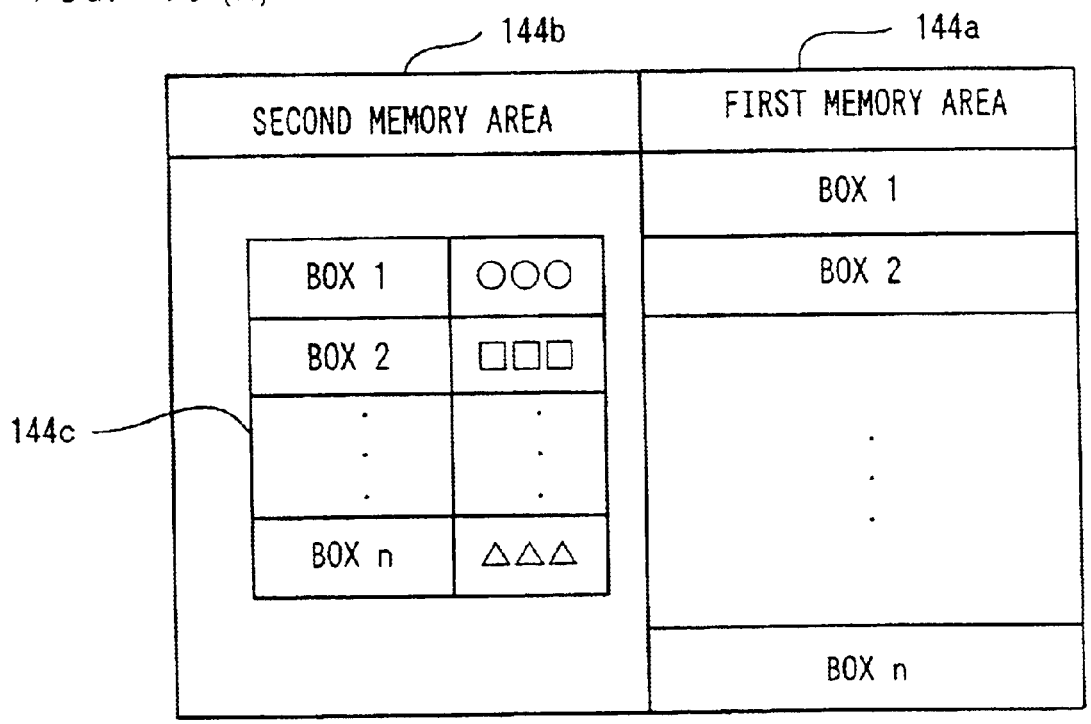
FIG. 13(A) is an explanatory view showing data stored in RAM 44 included in the communication device in the fourth embodiment.

To an address bus and a data bus for connecting CPU 40 with the gate array 142, ROM 143 which stores in memory a control program for CPU 140 to execute the above-mentioned various controls, facsimile numbers of transmitted parties, etc. and RAM 144 which store in memory various kinds of information to be supplied to the opposite facsimile device 161 are connected. The CPU 140 inputs and outputs necessary data between ROM 143 and RAM 144. Referring now to FIG. 13(A), main memory contents of RAM 144 are described in detail as follows.

RAM 144 has two memory areas of the first memory area 144a and the second memory area 144b. The first memory area 144a comprises a total of n pieces of boxes from BOX1 to BOXn, and various kinds of image information, for example, if the present communication device 101 is used for furnishing information on tax, explanation on the income tax, explanation on exemption of tax, etc. are stored in the boxes according to the kinds of information.

In the second memory area 144b, contents information is stored for indicating the memory contents of the first memory area 144a when the opposite facsimile device 161 requests transmission of information without specifying box No.

For example, for the contents information, as shown in FIG. 13 (A), the image information which has the title of the information in each box written in a table form, such as ○○○ for BOX1, □□□ for BOX2, . . . is used.

Now, returning to the explanation on FIG. 12, to the gate array 142, there are connected an image memory 154 for temporarily storing each data received as image data and an encoder sensor 159 for measuring the moving speed of the carriage (illustration omitted) on which a recording head 120 is mounted and determining the recording timing. In addition, the gate array 42 generates a recording clock 157 on the basis of the signal outputted by the encoder sensor 159 as the carriage moves. Further, to the gate array 142, a head driver IC 158 is connected, and this head driver IC 158 operates with the recording data 155 outputted from the gate array 142, the transfer clock 156 and recording clock 157, and drives the recording head 120.

In addition, to CPU 140, there are connected a recording paper sensor 150 for detecting the presence of recording paper, an original sensor 151 for detecting that the original is located at the reading portion of the image scanner 145, a carriage home position sensor 152 for detecting that the carriage is located at the home position, a first motor driver 170 for driving the carriage motor 114, a second motor driver 146 for driving the line feed motor 147 for rotating a platen roller, a third motor driver 149 for driving an image scanner motor 148, an operation panel 103 for giving various signals to CPU 140, and a liquid crystal display (LCD) 104.

Referring next to FIG. 3 and FIG. 4, explanation is made on contents of communication control executed by CPU 140 equipped to the communication device 101 when the transmission of information is requested by the opposite facsimile device 161.

CPU 140 detects the arrival of CALL signal transmitted from the opposite facsimile device 161 (S100: YES), when CPU detects the CNG signal (S102: YES), it transmits the DIS signal to the opposite facsimile device 161, that is, a signal for notifying the opposite facsimile device 161 of the communication capability of the communication device 101 (S104). Then, CPU 140 judges whether SEP signal and DTC signal have been received or not from the opposite facsimile device 161 (S106).

That is, CPU 140 judges whether SEP signal has been received for specifying box No. for fetching the information stored in the first memory area 144a together with DTC signal for showing a reply to DIS signal (S106).

And when CPU 140 has judged that SEP signal has been received (S106: YES), CPU 140 transmits DCS signal for instructing the opposite facsimile device 161 to receive the information (S108), and then, transmits TCF signal for confirming the communication speed set to the opposite facsimile device 161 (S110).

It is to be noted that the box No. data that shows box No. indicated by the SEP signal received in S304 above is temporarily stored in RAM 144.

Then, when CPU 140 detects the receipt of CFR signal for completion of preparation for receiving information (S112: YES), it reads out the box No. data temporarily stored in RAM 144, and the image information (PIX) corresponding to box No. shown by the box No. data read-out from the box area 144a, and the read-out is transmitted to the opposite facsimile device 161 (S114). This transmitted information is recorded in the recording paper by the opposite facsimile device 161, and the person who uses the opposite facsimile device 161 is able to know the information by viewing the contents recorded.

And when CPU 140 finishes transmission of the information, it transmits EOP signal for showing the end of facsimile transmission procedure (S116), and when it receives MCF signal which is the affirmative reply signal for EOP signal (S118), CPU 140 transmits DCN signal for instructing disconnection of the communication circuit (S120).

On the other hand, if the side requesting transmission of information does not know the box No. and requests transmission of information by general polling, no SEP signal if transmitted from the opposite facsimile device 161. CPU 140 thus judges that it did not receive SEP signal in Step 106 (S106: NO). When CPU 140 transmits DCS signal (S122), transmits TCF signal (S124), and receives CFR signal (Step 126: YES), CPU 140 reads out the contents information 144c from the second memory area 144b of RAM 144, and transmits the read-out contents information 144c to the opposite facsimile device 161 (S128). The information received is recorded on recording paper by the opposite facsimile device 161, and the information transmission requesting side can learn what kind of information is stored in the first memory area 144a of RAM 144 of the communication device, that is, what kind of information is able to be obtained by associating it with box No. And CPU 140 transmits EOP signal when transmission of information is completed (S130), and when it receives MCF signal (S132), CPU 140 transmits DCN signal (S134).

As described above, since using the communication device 101 according to the fourth embodiment, it is possible to notify the opposite of the contents of the information stored in the first memory area 144a when the opposite party does not specify the information, the opposite party is able to obtain the information which he or she wants to originally have by carrying out F-code bulletin board communication with box No. specified again after viewing the contents notified.

That is, using the communication device 101 of the fourth embodiment, it is possible to provide a communication device whereby the information supplying side does not need to notify box No. to the information requesting side through mass media, etc. as in the conventional case.

Meanwhile, the above SEP signal corresponds to a transmission requesting signal. The process in S106 executed by CPU 140 functions as a judgment device; the process in S114, a first transmission device; and the process in S128, a second transmission device.

Figure 13B:
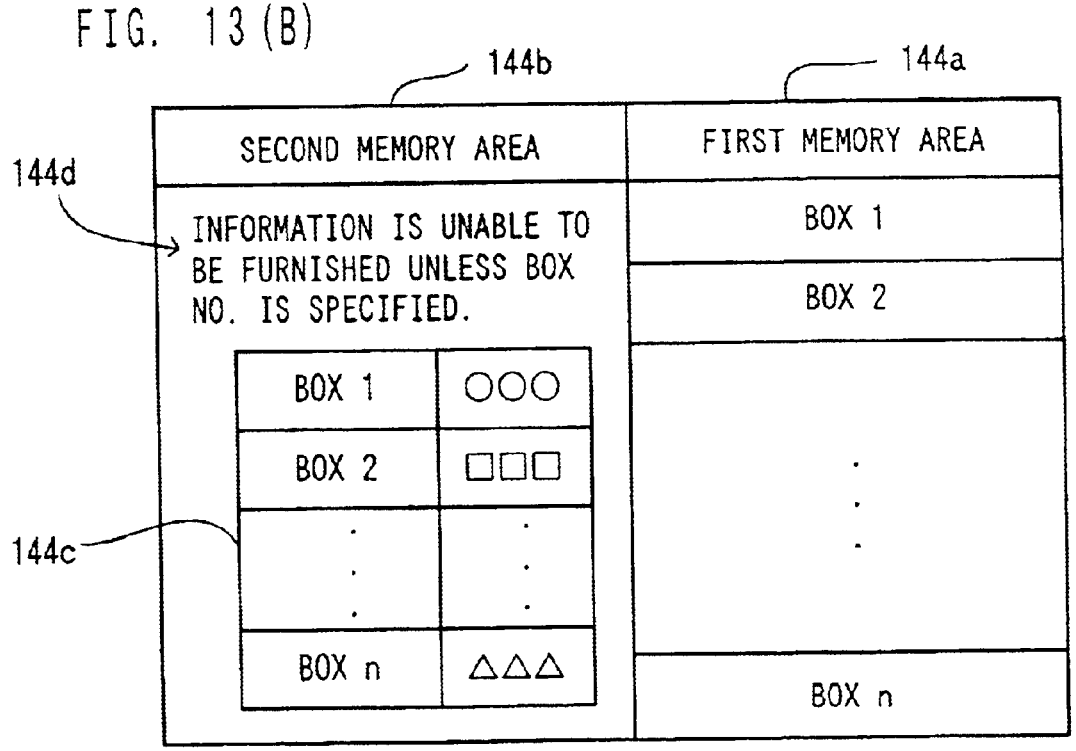
FIG. 13(B) is an explanatory view showing data stored in RAM 44 included in the communication device in a fifth embodiment.
Figure 16:
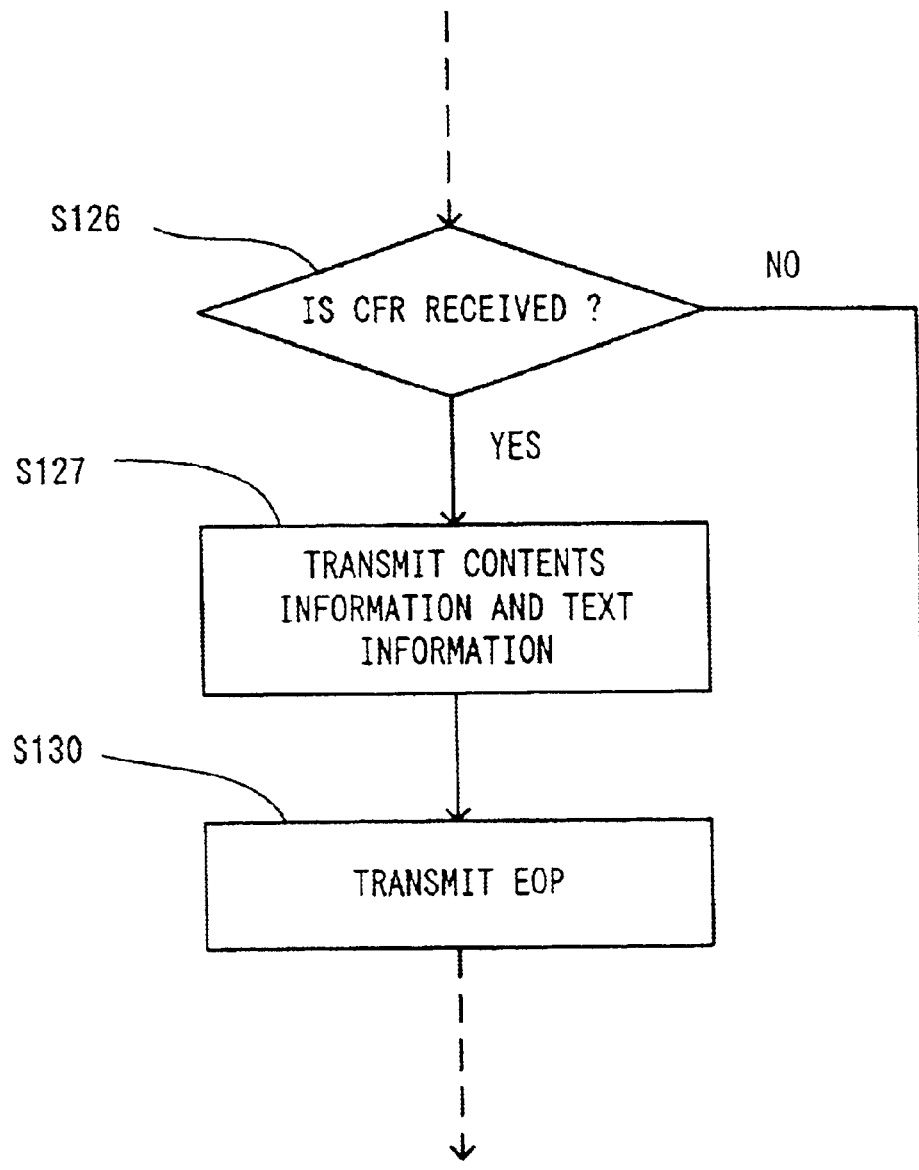
FIG. 16 is a flowchart showing the communication control to be executed by CPU of the communication device in the fifth embodiment, a part of which is omitted.

Referring now to FIG. 13(B) and FIG. 16, the communication device according to the fifth embodiment of the present information will be described in detail as follows.

The feature of the fifth embodiment is in that when the opposite facsimile device 161 equipped with no function for executing F-code bulletin board communication requests to furnish information using general polling, the facsimile device can notify the opposite facsimile device 161 of causes of inability for furnishing information and contents of information which can be furnished.

FIG. 13(B) is an explanatory view showing main memory contents of RAM 144. FIG. 16 is a flowchart showing the communication control to be executed by CPU of the communication device in the fifth embodiment, a part of which is omitted.

Figure 15:
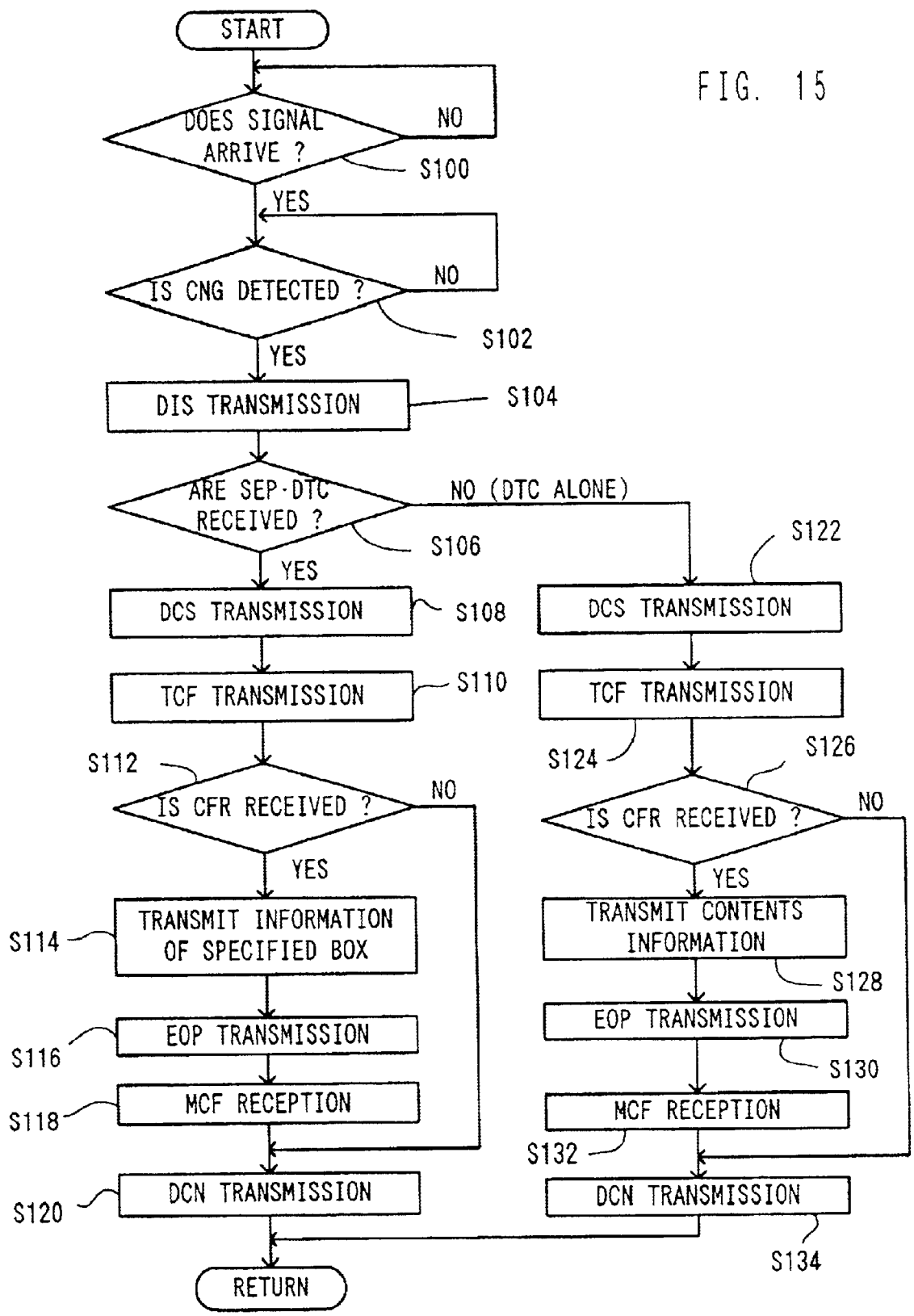
FIG. 15 is a flowchart showing the communication control to be executed by CPU 140 in the fourth embodiment.

Since the configuration of the control system of the communication device in the fifth embodiment is the same as that of the communication device 101 in the fourth embodiment above, and the contents of the communication control executed by CPU 140 are same except S128 of FIG. 15, description of the same portions will be omitted.

First of all, referring to FIG. 13(B), the memory contents of RAM 144 will be described. RAM 144 has two memory areas, namely, the first memory area 144a and the second memory area 144b. The first memory area 144a has the configuration same as that of the fourth embodiment. In the second memory area 144b, there are stored the notice information 144d for notifying the information transmission requesting side of the effect of incapability to fetch the information, for example, "information is unable to be furnished unless box No. is specified", or information is unable to be furnished unless your facsimile device is F-code-ready", and the contents information 144c same as that of the fourth embodiment.

Next, the communication control to be executed by CPU 140 will be described with reference to FIG. 16.

CPU 140 executes the processes S100 to S104 shown in FIG. 15. When SEP signal is not transmitted from the opposite facsimile device 161 (S106: No), CPU 140 transmits DCS signal and TCF signal (S122, S124). Upon detecting the arrival of CFR signal transmitted from the opposite facsimile device 161 (S126: Yes) CPU 140 transmits the notice information 144d and the contents information 144c stored in the second memory area 144b of RAM 144 to the opposite facsimile device 161 (S127).

Both the information transmitted are recorded on a recording sheet by the opposite facsimile device 161. Thus, the user on the information transmission requesting side device looks the recorded notice information 144d and learn that the facsimile device 161 is unable to obtain the desired information. Additionally, the user, looking over the received contents information 144c, can learn the contents information ready in the device of the information furnishing side. On the basis of the contents, the user may request the information transmission again, for example, with the other communication device equipped with the above function.

CPU 140 transmits EOP signal (S130) upon completion of the information transmission and, as shown in FIG. 15, transmits DCN signal (S134) when received MCF signal (S132).

As above, using the communication device 101 in the fifth embodiment, when the information is requested from the opposite facsimile device 161 with no function for performing F-code bulletin board communication, it is possible to notify the information requesting side via facsimile communication of the effect of incapability to fetch the information unless box No. is specified, thereby preventing the occurrence of indefinite communication error in the opposite facsimile device 161.

Furthermore, since the available contents information is notified to the information requesting side device, the person requesting information can obtain the information using the facsimile device provided with the function for performing F-code code bulletin board communication.

In the above embodiments, the communication control shown in the flowchart of FIGS. 15 and 16 is executed by CPU 140 built-in the recording device 101. The control and processing may be conducted by CPU 164a of PC 164 if CD-ROM or FD storing computer programs for executing the control and processing is driven in PC 164 and the computer programs are installed in HDD (Hard disk drive) 164b. In this state, the CD-ROM or FD functions as a memory medium.

Next, a sixth embodiment of a communication device according to the present invention will be explained with reference to FIGS. 17–19. It is to be noted that the control system of the communication device in the sixth embodiment is substantially the same as that in the fourth embodiment, and its detailed description is omitted. Like elements corresponding to those in the fourth embodiment are indicated by like numerals.

Figure 17:
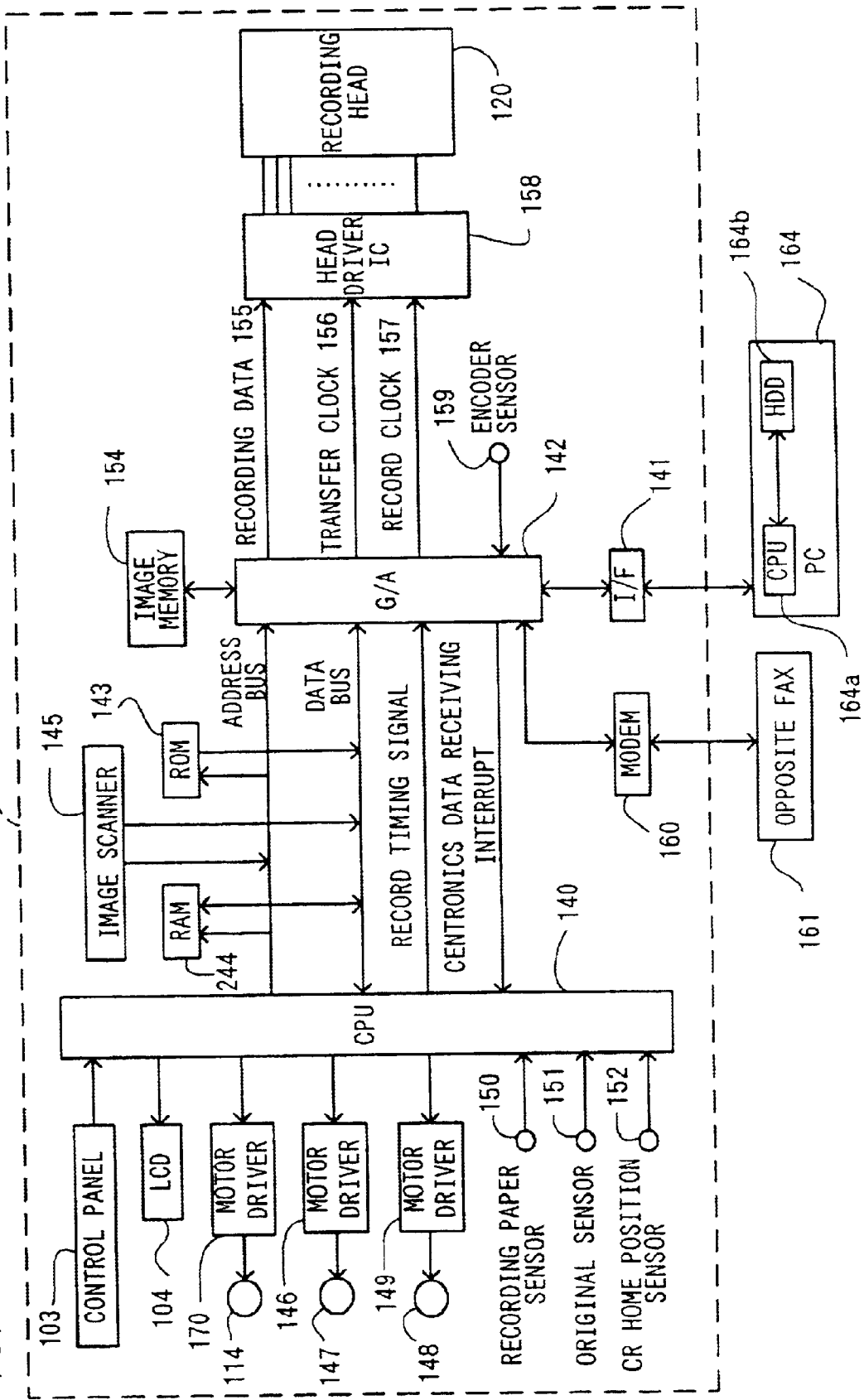
FIG. 17 is a block diagram of a main control system of a communication device in a sixth embodiment according to the present invention.

As shown in FIG. 17, instead of RAM 144 of the fourth embodiment, RAM 244 is connected to the address bus and the data bus connecting CPU 140 and the gate array 142.

Figure 18A:
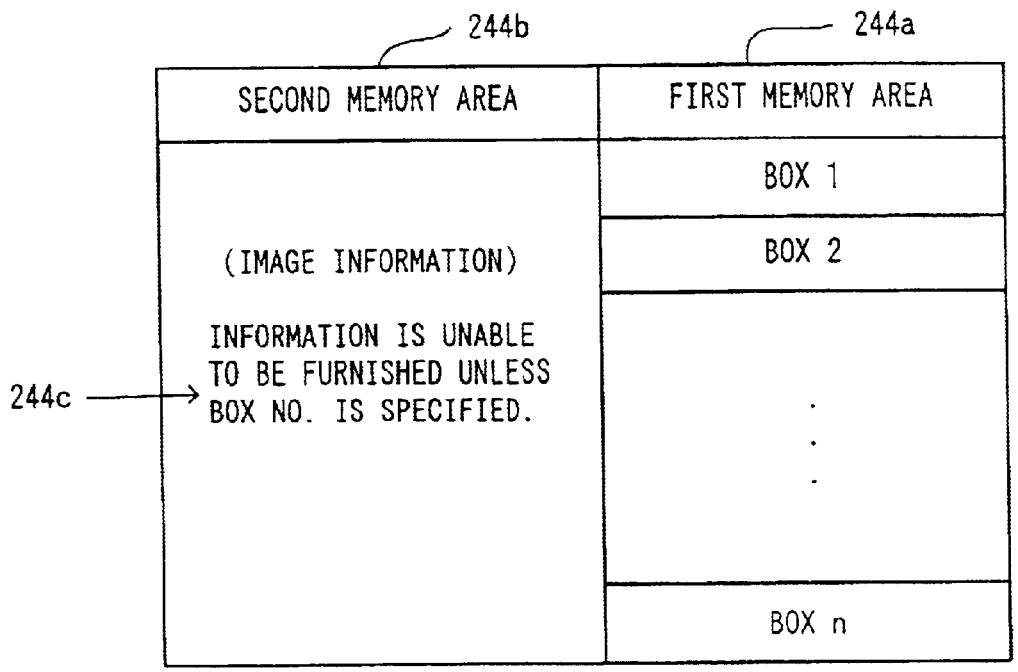
FIG. 18(A) is an explanatory view showing data stored in RAM 244 included in the communication device in the sixth embodiment.

The main contents stored in this RAM 244 are described, referring to FIG. 18(A).

RAM 244 has two memory areas of the first memory area 244a and the second memory area 244b. The first memory area 244a comprises a total of n pieces of boxes from BOX1 to BOXn, and various kinds of image information, for example, if the present communication device 201 is used for furnishing information on tax, explanation on the income tax, explanation on exemption of tax, etc. are stored in the boxes according to the kinds of information.

In the second memory area 244b, there is stored the image information for notifying the information transmission requesting side of the effect of incapability to fetch the information, for example, the image information (referred hereinafter to as notice image information) 244c such as "Information is unable to be furnished unless Box No. is specified.", or Information is unable to be furnished unless your facsimile device is F-code-ready.".

It is to be noted that RAM 244 corresponds to a memory device, the notice image information 244c corresponds to image information for judgment results.

Figure 14:
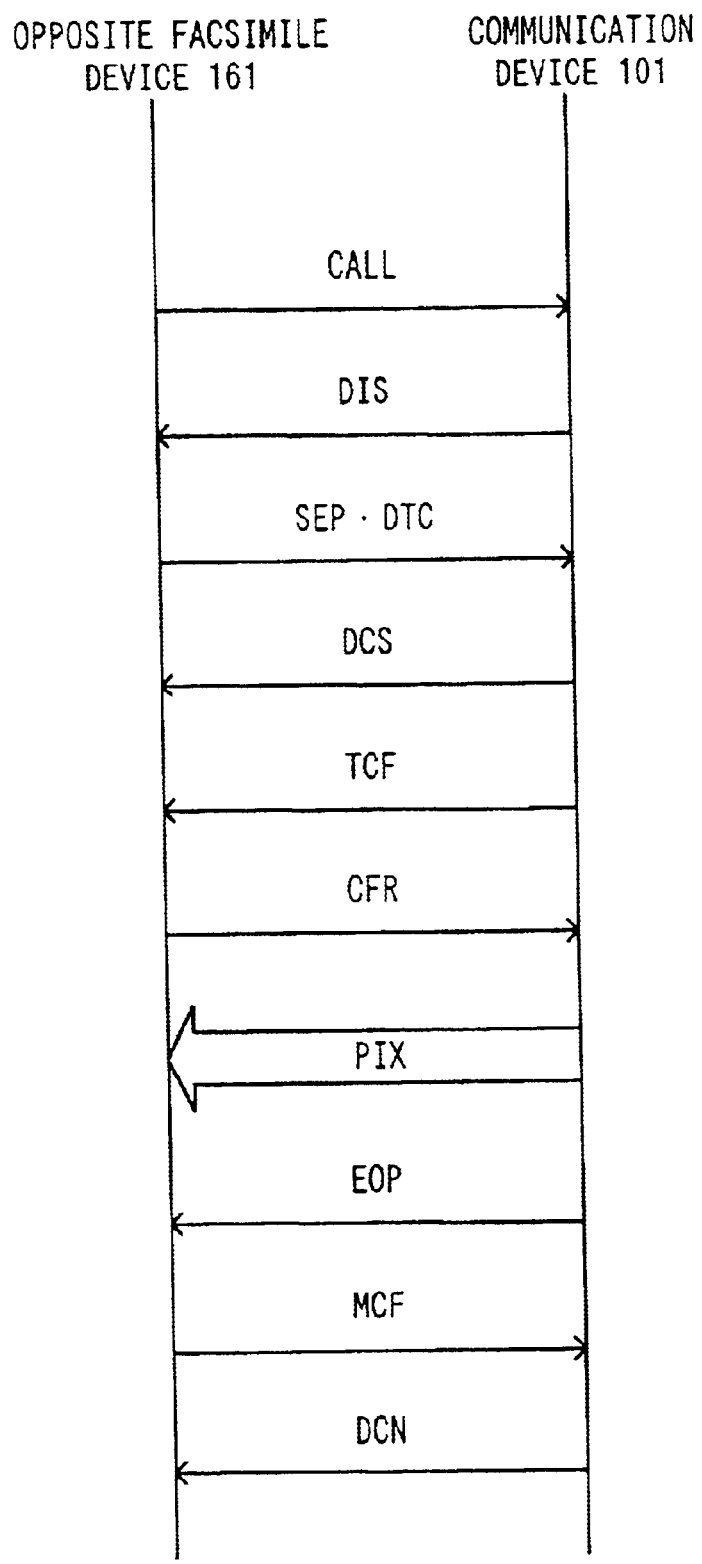
FIG. 14 is an explanatory view to explain a communication process to be executed between a communication device 101 and an opposite facsimile device 161.

Next, description is made on the communication control contents to be executed by CPU 140 equipped in the communication device 201 when the information transmission is requested from the opposite facsimile device 161. The communication procedures conducted between the communication device 201 of the present embodiment and the opposite facsimile device 161 are substantially the same as in the fourth embodiment, and the explanation is referred to FIG. 14. FIG. 19 is a flowchart shoring the communication control processing to be executed by CPU 140 in the present embodiment. Here, only different processing from the fourth embodiment is explained.

When the information transmission is requested by general polling from the opposite facsimile device 161 with no function for conducting F-code bulletin board communication, SEP signal is not transmitted from the opposite device 161. CPU 140 judges that no SEP signal is received in S106 (S106: No), transmits DCS signal (S122), reads out the notice image information 244c from the second memory area 244b of RAM 244 and transmits the read information 244c to the opposite facsimile device 161 (S228). This transmitted notice image information 244c is recorded by the opposite facsimile device 161, so that the user on the information transmission requesting side device can look the recorded contents and visually learn that the desired information is not available with the relevant facsimile device (161).

If the opposite facsimile device 161 is equipped with LCD, it is possible to arrange the device 161 to display the notice image information on the LCD. When PC is connected to the opposite facsimile device 161, CRT or LCD equipped in the PC can be used to display the notice image information.

Upon completion of information transmission, CPU 140 transmits EOP signal (S130), receives MCF signal (S132) and transmits DCN signal (S134).

As above, using the communication device 201 in the sixth embodiment, when the information is requested by general polling from the opposite facsimile device 161 with no function for performing F-code bulletin board communication, it is possible to notify the information requesting side via facsimile communication of the effect of incapability to fetch the information, thereby preventing the occurrence of communication error of unknown origin in the facsimile device (161) of the information transmission requesting side.

It is to be noted that the SEP signal corresponds to transmission requesting signal, the processing in S106 executed by CPU 140 functions as a judgment device, the processing in S114 functions as a first transmission device, the processing in S128 functions as a second transmission device.

Figure 18B:
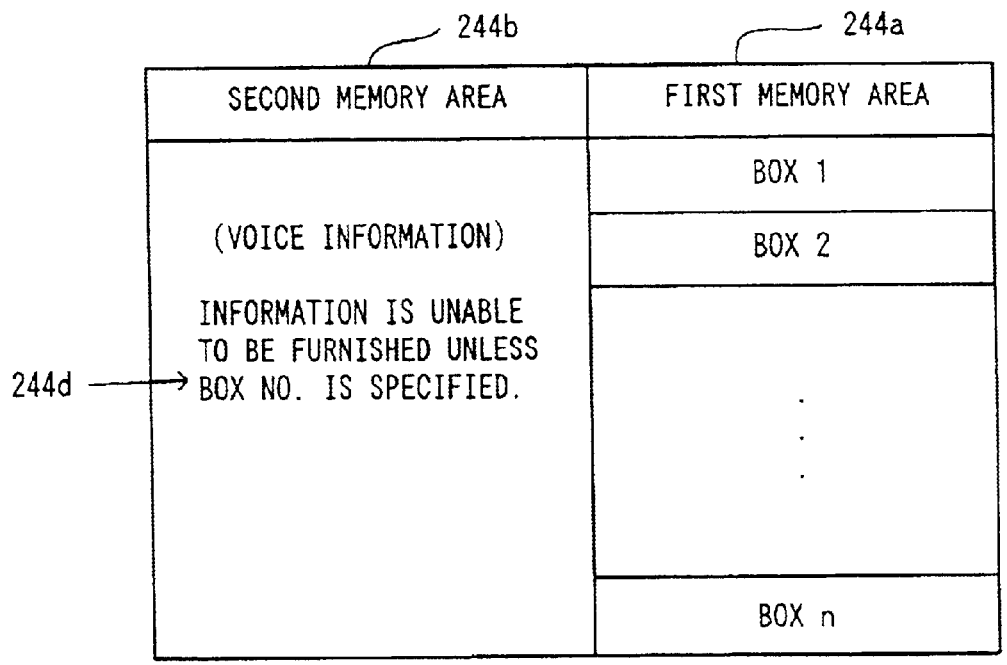
FIG. 18(B) is an explanatory view showing data stored in RAM 244 included in the communication device in a seventh embodiment.

Referring now to FIG. 18(B) and FIG. 20, the communication device according to a seventh embodiment of the communication device will be described as follows.

The feature of the seventh embodiment is that when the opposite facsimile device 161 equipped with no function for executing F-code bulletin board communication requests to furnish information using general polling, the facsimile device can notify the opposite facsimile device 161, by voice information, of causes of inability for furnishing information.

FIG. 18(B) is an explanatory view showing main stored contents of RAM 244. FIG. 20 is a flowchart showing the communication control to be executed by CPU of the communication device in the seventh embodiment, a part of which is omitted.

Figure 19:
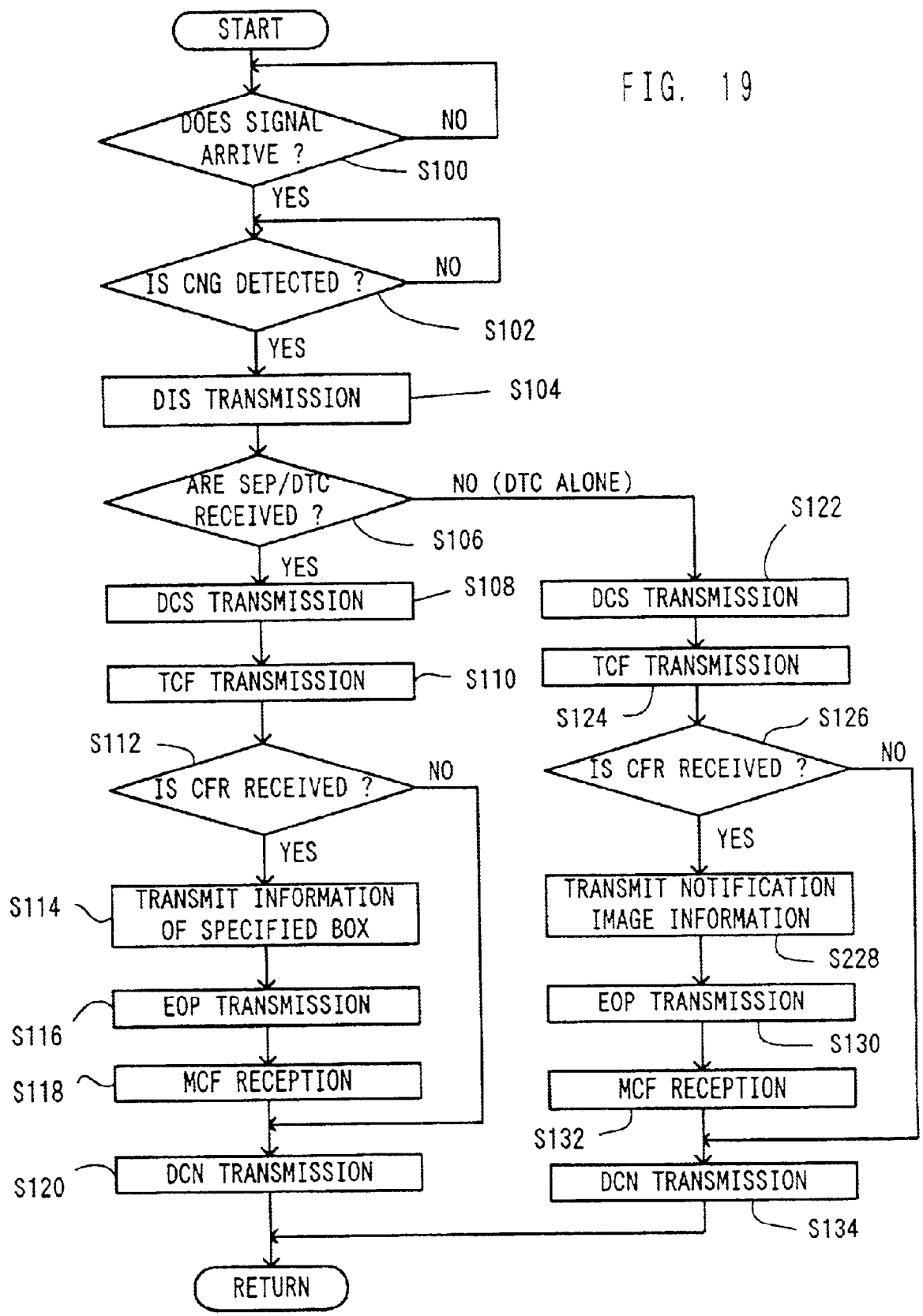
FIG. 19 is a flowchart showings the communications control to be executed by CPU 140 in the sixth embodiment.

Since the configuration of the control system of the communication device in the seventh embodiment is the same as that of the communication device 201 in the sixth embodiment above, and the contents of the communication control executed by CPU 140 are same except S228 of FIG. 19, description of the same portions will be omitted.

First of all, referring to FIG. 18(B), the memory contents of RAM 244 will be described. RAM 244 has two memory areas, namely, the first memory area 244a and the second memory area 244b. The first memory area 244a has the configuration same as that of the sixth embodiment. In the second memory area 244b, there are stored the notice information for notifying the information transmission requesting side by voice of the effect of incapability to fetch the information, for example, the message (referred hereinafter to as notice voice information) 244d such as "information is unable to be furnished unless box No. is specified", or "information is unable to be furnished unless your facsimile device is F-code-ready".

For the form of the notice voice information 244d, human voice converted to digital data or character information indicating each of the above messages is adopted.

Note that the notice voice information 244d corresponds to voice information for judgment results.

Next, the communication control to be executed by CPU 140 is explained with reference to FIG. 20.

CPU 140 executes the processes S100 to S104 shown in FIG. 19. When SEP signal is not transmitted from the opposite facsimile device 161 (S106: No), CPU 140 transmits DCS signal and TCF signal (S122, S124). Upon detecting the arrival of CFR signal transmitted from the opposite facsimile device 161 (S126: Yes), CPU 140 transmits the notice voice information 244d stored in the second memory area 244b of RAM 244 to the opposite facsimile device 161 in a BFT (binary-file-transfer) mode (S127).

This transferred notice voice information 244d is reproduced by a voice information reproducing device (not shown) equipped in the opposite facsimile device 161. The user of the device of the information transmission requesting side listens to the reproduced voice sound and can learn that the desired information is not available with the own facsimile device.

For the voice information reproducing device, a voice circuit or a speaker which reproduces digital data is adopted for the voice information which is digital data converted from human voice, or a converting device which converts the received character information into voice sound for the voice information which is the character information comprising messages.

CPU 140, upon completion of the information transmission, transmits EOP signal (S130), receives MCF signal (S132) and transmits DCN signal (S134).

As above, using the communication device 201 in the seventh embodiment, when the information is requested by general polling from the opposite facsimile device 161 with no function for performing F-code bulletin board communication, it is possible to notify the information requesting side by voice sound of the effect of incapability to fetch the information, thereby preventing the occurrence of communication error of unknown origin in the facsimile device 161 on the information transmission requesting side.

Note that the processing in S227 executed by CPU 140 corresponds to a second transmission device.

In the above embodiments, the communication control shown in the flowchart of FIGS. 19 and 20 is executed by CPU 140 built-in the recording device 201. The control and processing may be conducted by CPU 164*a* of PC 164 if CD-ROM or FD storing computer programs for executing the control and processing is driven in PC 164 and the computer programs are installed in HDD (Hard disk drive) 164*b*. In this state, the CD-ROM or FD functions as a memory medium.

The present invention may be embodied in other specific forms without departing from the spirit or essential characteristics thereof. For instance, the following modifications may be used.

(a) Although five confidential boxes 31 with the box No. 101–105 are provided in the first to third embodiments, six or more confidential boxes may be provided.

(b) Although six bulletin board boxes 32 with the box No. 01–03 and 11–13 are provided in the first to third embodiment, seven or more bulletin board boxes may be provided.

(c) Although the image data of the bulletin board box 32 accompanied with box No. 01 is registered in advance in the first to third embodiments, the image data may be automatically produced on the basis of the registered data of each of the memory boxes 31 and 32.

(d) In the first to third embodiments, the image data of the bulletin board box 32 of box No. 01 is transferred. The image on the information fetching method may be registered in the bulletin board box 32 of an optional box No.

(e) In the first to third embodiments, the information on "box No." and "identification No." from the calling side are transmitted in a form of DTMF signal. The information may be indicated by the transfer control of the facsimile device.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile device including:
    an image data memory for storing image data;
    a plurality of memory boxes provided in the image data memory, each of the memory boxes being accompanied with a predetermined box number and storing first image data therein;
    a detection device for detecting a transfer command arrived to the facsimile device, the transfer command specifying a memory box in accordance with the box number and instructing transfer of the first image data stored in the specified memory box to a calling side;
    a judgment device for judging whether or not the memory box specified by the transfer command using the box number detected by the detection device is effective; and
    an image transfer device for transferring the first image data stored in the specified memory box to the calling side when the judgment device judges that the memory box specified by the transfer command is effective, and alternatively for transferring second image data different from the first image data to the calling side when the judgment device judges that the memory box specified by the transfer command is ineffective;
    wherein the memory box includes plurality of confidential boxes and bulletin board boxes,
    wherein each of the confidential boxes is accompanied with the box number and an identification number, and each of the bulletin board boxes is accompanied with only the box number,
    wherein the second image data is stored in a memory box specified by advance from among the memory boxes, and
    wherein the image transfer device transfers the second image data stored in the specified memory box to the calling side when the judgment device judges that the designation of memory box specified by the transfer command is ineffective.

2. The facsimile device according to claim 1, wherein the judgment device judges whether or not the memory box corresponding to the box number specified by the transfer command exists and judges that designation of the memory box specified by the transfer command is effective when the memory box corresponding to the box number specified by the transfer command exists and that the designation of the memory box specified by the transfer command is ineffective when the memory box corresponding to the box number specified by the transfer command does not exist.

3. The facsimile device according to claim 2, wherein when the judgment device judges that the memory box corresponding to the box number specified by the transfer command does not exist, the image transfer device transfers the second image data to the calling side.

4. The facsimile device according to claim 1, wherein the transfer command includes information of the box number and the identification number corresponding to the confidential box and a telephone number of the calling side, and information of the box number corresponding to the bulletin board box and a telephone number of the calling side.

5. The facsimile device according to claim 4, wherein the judgment device judges whether or not the identification number assigned to the confidential box coincides with the identification number included in the transfer command when the box number specified by the transfer command coincides with the box number of the confidential box.

6. The facsimile device according to claim 5, wherein the image transfer device transfers the second image data to the calling side when the judgment device judges that the identification number assigned to the confidential box does not coincide with the identification number included in the transfer command.

7. The facsimile device according to claim 4, wherein an effective number of digits of the box number for the confidential box is set to three, an effective number of the identification number for the confidential box is set to four, and an effective number of the box number for the bulletin board box is set to two.

8. The facsimile device according to claim 7, wherein the judgment device sets a numeral "0" to a second digit of the box number when the number of digits of the box number of the memory box detected by the detection device is single-digit and, then, judges whether or not the memory box specified by the transfer command using the box number is effective.

9. The facsimile device according to claim 1, wherein when the judgment device judges that the memory box accompanied with the box number specified by the transfer command stores no image data, the image transfer device transfers the second image data to the calling side.

10. The facsimile device according to claim 1, wherein the second image data is image data indicating an operation manual.

11. The facsimile device according to claim 10, wherein image data of the operation manual includes at least a method of specifying the box number and the identification number.

12. The facsimile device according to claim 11, wherein the image data of the operation manual includes at least information registered in each of the memory boxes.

13. The facsimile device according to claim 1, wherein the image transfer device transfers the second image data stored in the specified memory box to the calling side when the judgment device judges that the memory box corresponding to the box number specified by the transfer command does not exist.

14. The facsimile device according to claim 1, wherein the transfer command includes information of the box number and the identification number corresponding to the confidential box and a telephone number of the calling side, and information of the box number corresponding to the bulletin board box and a telephone number of the calling side.

15. The facsimile device according to claim 14, wherein the image transfer device transfers the second image data stored in the specified memory box to the calling side when the judgment device judges that the identification number assigned to the confidential box does not coincide with the identification number included in the transfer command.

16. The facsimile device according to claim 1, wherein when the judgment device judges that the memory box accompanied with the box number specified by the transfer command stores no image data, the image transfer device transfers the second image data stored in the specified memory box to the calling side.

17. The facsimile device according to claim 1, wherein the second image data includes at least a method of specifying the box number and the identification number.

18. The facsimile device according to claim 17, wherein second image data includes at least information registered in each of the memory boxes.

19. The facsimile device according to claim 1, wherein the specified memory box is set to one of the bulletin board boxes.

20. The facsimile device according to claim 2 further including:
a message data memory for storing in advance a plurality of message data;
a transfer data setting device for choosing a first message data from the message data memory, the first message data indicating that designation of the memory box number is ineffective, when the judgment device judges that the designation of the memory box specified by the transfer command is ineffective, and for setting transfer data in accordance with the chosen first message data.

21. The facsimile device according to claim 20, wherein the image transfer device transfers to the calling side the transfer data corresponding to the first message data set by the transfer data setting device.

22. The facsimile device according to claim 21, wherein
when the judgment device judges that the memory box corresponding to the box number specified by the transfer command does not exist, the transfer data setting device chooses a second message data from the message data memory, the second message data indicating that the memory box corresponding to the specified box number does not exist, and sets the transfer data in accordance with the chosen second message data;
the image transfer device transfers the transfer data corresponding to the second message data set by the transfer data setting device to the calling side.

23. The facsimile device according to claim 20, wherein the transfer command includes information of the box number and the identification number corresponding to the confidential box and a telephone number of the calling side, and information of the box number corresponding to the bulletin board box and a telephone number of the calling side.

24. The facsimile device according to claim 23, wherein the judgment device judges whether or not the identification number assigned to the confidential box coincides with the identification umber included in the transfer command when the box number specified by the transfer command coincides with the box number of the confidential box.

25. The facsimile device according to claim 24, wherein when the judgment device judges that the identification number assigned to the confidential box does not coincide with the identification number included in the transfer command, the image transfer data setting device chooses a third message data from the message data memory, the third message indicating that the identification number assigned to the confidential box does not coincide with the identification number included in the transfer command, and sets the transfer data in accordance with the chosen third message data; and
the image transfer device transfers the transfer data corresponding to the third message data set by the transfer data setting device to the calling side.

26. The facsimile device according to claim 20, wherein when the judgment device judges that the memory box accompanied with the box number specified by the transfer command stores no image data, the transfer data setting device chooses a fourth message data from the message data memory, the fourth message data indicating that the memory box of the box number specified by the transfer command stores no image data, and sets the transfer data in accordance with the chosen fourth message data; and the image transfer device transfers the transfer data corresponding to the fourth message data set by the transfer data setting device to the calling side.

27. The facsimile device according to claim 20, wherein the first message data includes at least explanation of a specifying method of the box number.

28. The facsimile device according to claim 25, wherein the third message data includes at least explanation of a specifying method of the identification number.

29. The facsimile device according to claim 26, wherein the fourth message data includes at least explanation of information registered in each of the memory boxes.

30. The facsimile device according to claim 14, wherein the judgment device judges whether or not the identification number assigned to the confidential box coincides with the identification number included in the transfer command when the box number specified by the transfer command coincides with the box number of the confidential box.

* * * * *